(12) United States Patent
Takami et al.

(10) Patent No.: US 8,420,262 B2
(45) Date of Patent: Apr. 16, 2013

(54) NONAQUEOUS ELECTROLYTE BATTERY, BATTERY PACK AND VEHICLE

(75) Inventors: Norio Takami, Yokohama (JP); Hiroki Inagaki, Kawasaki (JP); Shinsuke Matsuno, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1363 days.

(21) Appl. No.: 12/020,708

(22) Filed: Jan. 28, 2008

(65) Prior Publication Data

US 2008/0241689 A1    Oct. 2, 2008

(30) Foreign Application Priority Data

Mar. 27, 2007    (JP) ................. 2007-082697

(51) Int. Cl.
*H01M 4/13* (2010.01)
*H01M 4/58* (2010.01)
*H01M 2/18* (2006.01)

(52) U.S. Cl.
USPC .............. 429/224; 429/231.95; 429/146

(58) Field of Classification Search ........... 429/231.1, 429/231.234, 129, 223, 224, 146, 231.95
See application file for complete search history.

(56) References Cited

U.S. PATENT DOCUMENTS

| | | | | |
|---|---|---|---|---|
| 4,166,755 A * | 9/1979 | Fister et al. | .............. | 428/687 |
| 2004/0219431 A1* | 11/2004 | Ozaki et al. | ............ | 429/231.4 |
| 2004/0229123 A1* | 11/2004 | Takahashi et al. | ......... | 429/231.1 |
| 2005/0069777 A1 | 3/2005 | Takami et al. | | |
| 2005/0221173 A1* | 10/2005 | Tatebayashi et al. | ......... | 429/161 |
| 2005/0233220 A1* | 10/2005 | Gozdz et al. | ............. | 429/231.95 |
| 2009/0004567 A1* | 1/2009 | Yonezawa et al. | ............ | 429/221 |

FOREIGN PATENT DOCUMENTS

| | | |
|---|---|---|
| JP | 8-298137 | 11/1996 |
| JP | 11-86875 | 3/1999 |
| JP | 2002-42889 | 2/2002 |

OTHER PUBLICATIONS

JP11-086875A_1999 translation, orignnal patent is in IDS.*
JP,08-298137,A_1996. translation, orignnal patent is in IDS.*
U.S. Appl. No. 12/199,160, filed Aug. 27, 2008, Inagaki, et al.

* cited by examiner

*Primary Examiner* — Patrick Ryan
*Assistant Examiner* — Alex Usyatinsky
(74) *Attorney, Agent, or Firm* — Oblon, Spivak, McClelland, Maier & Neustadt, L.L.P.

(57) ABSTRACT

A nonaqueous electrolyte battery includes a negative electrode and a positive electrode. The negative electrode includes a negative electrode current collector and a negative electrode active material having a lithium ion absorption potential of 0.4 V (vs. Li/Li+) or more. The negative electrode current collector is made of aluminum or an aluminum alloy. The positive electrode includes a positive electrode current collector and a positive electrode active material. The positive electrode current collector has a total area and specific capacitance larger than those of the negative electrode current collector, and is made of aluminum or an aluminum alloy.

19 Claims, 11 Drawing Sheets

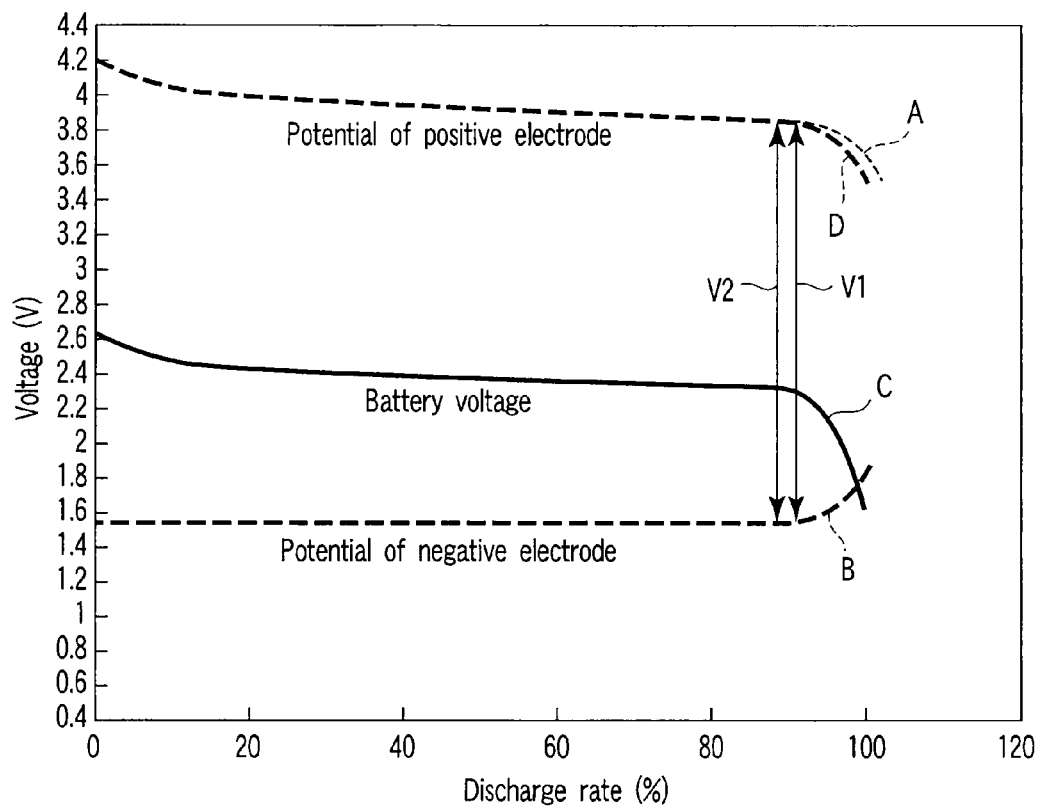
F I G. 1
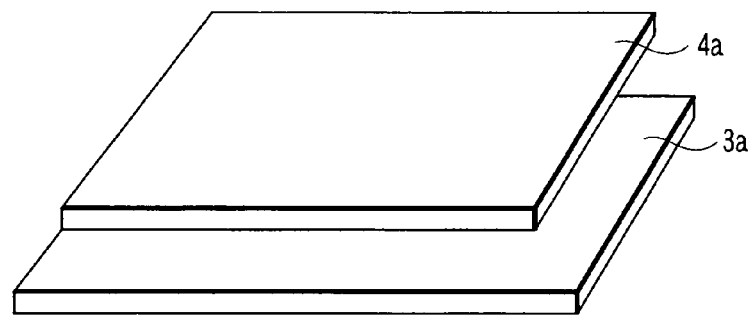
F I G. 2

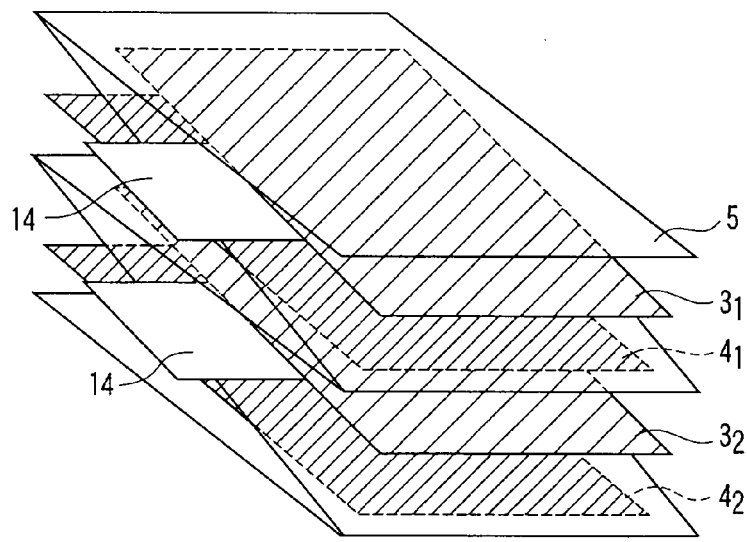
F I G. 7
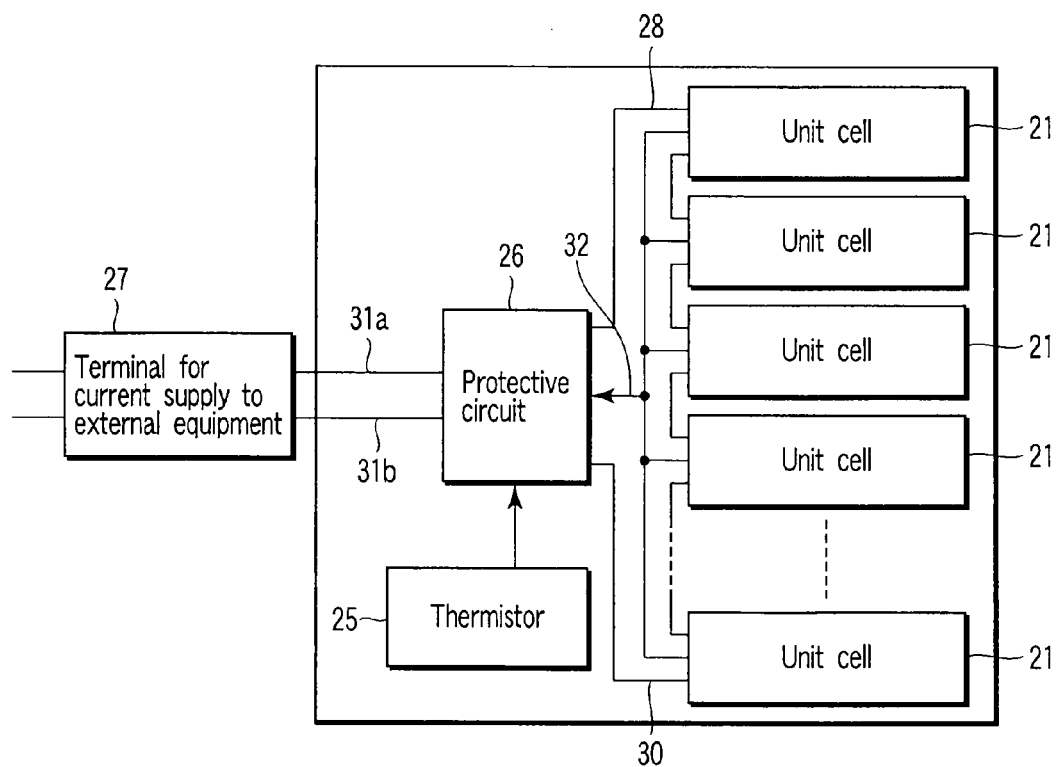
F I G. 10

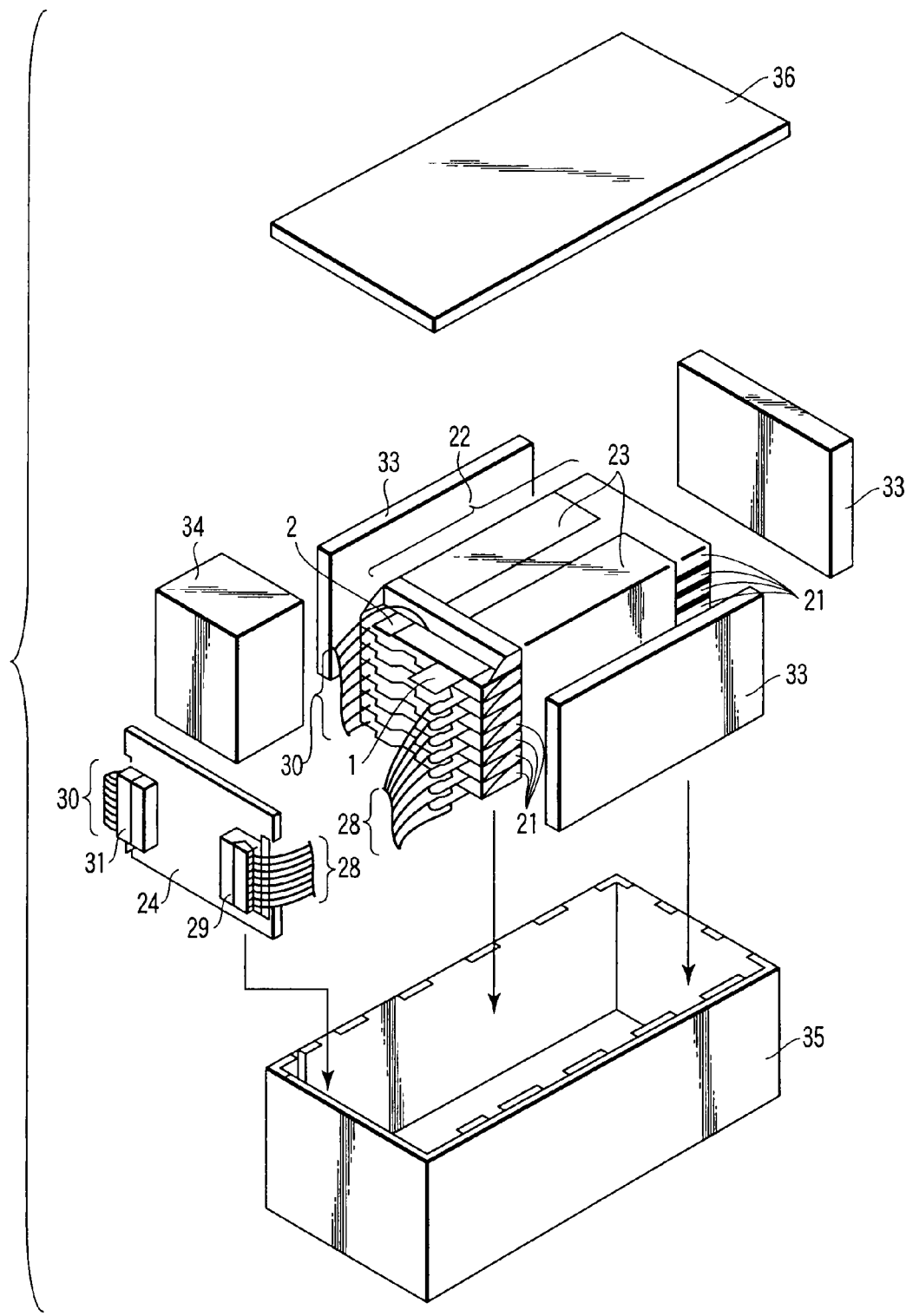
F I G. 9

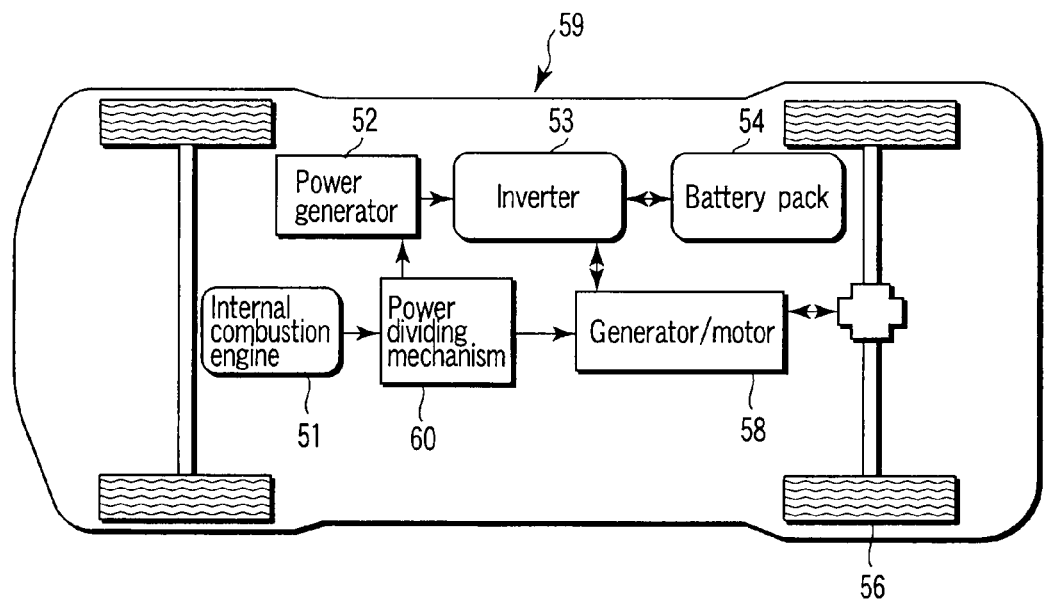
F I G. 13
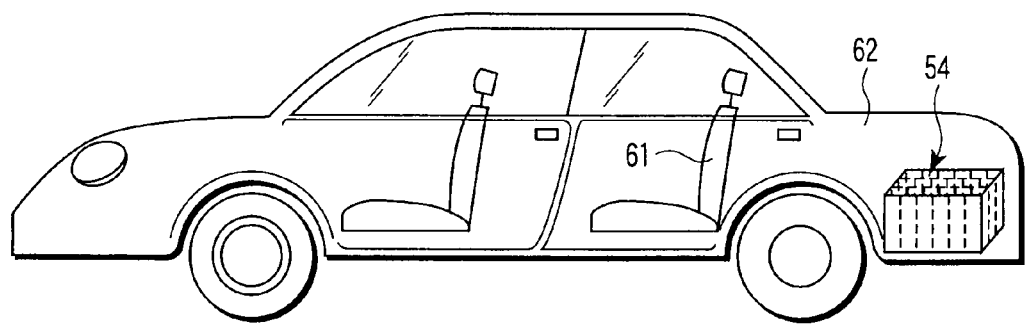
F I G. 14

NONAQUEOUS ELECTROLYTE BATTERY, BATTERY PACK AND VEHICLE

CROSS-REFERENCE TO RELATED APPLICATIONS

This application is based upon and claims the benefit of priority from prior Japanese Patent Application No. 2007-082697, filed Mar. 27, 2007, the entire contents of which are incorporated herein by reference.

BACKGROUND OF THE INVENTION

1. Field of the Invention

The present invention relates to a nonaqueous electrolyte battery, and a battery pack and a vehicle using the nonaqueous electrolyte battery.

2. Description of the Related Art

Research and development of a nonaqueous electrolyte battery comprising a negative electrode containing metallic lithium, a lithium alloy, a lithium compound or carbonaceous materials have been actively advancing as a high energy density battery or high power density battery. A lithium ion battery comprising a positive electrode containing $LiCoO_2$ or $LiMn_2O_4$ as an active material and a negative electrode containing a carbonaceous material for absorption/release of lithium ions has been put into practical use. Metal oxides or alloys as substitutes of the carbonaceous material in the negative electrode have been also studied.

A copper foil is used for a current collector of these negative electrodes. However, the discharge capacity rapidly decreases when the nonaqueous electrolyte battery having the current collector made of copper foil is overdischarged since a dissolving reaction of the copper foil is accelerated by an increase in potential of the negative electrode. Accordingly, a protective circuit for preventing the battery from being overdischarged is provided in the nonaqueous electrolyte battery. However, the nonaqueous electrolyte battery having the protective circuit was disadvantage in terms of the energy density.

Accordingly, there has been proposed a nonaqueous electrolyte battery comprising a negative electrode current collector containing aluminum or an aluminum alloy, and a negative electrode including a negative electrode layer containing at least one negative electrode active material selected from the group consisting of a metal, an alloy or a compound for absorption/release of lithium ions, as described in JP-A 2002-42889 (KOKAI). This structure can provide a nonaqueous electrolyte battery improved in energy density and overdischarge cycle performance.

However, the nonaqueous electrolyte battery described in JP-A 2002-42889 (KOKAI) involves a problem in the performance under a high temperature environment.

JP-A 8-298137 (KOKAI) discloses using an electrolytic aluminum foil having a roughened surface and a specific capacitance of 50 μF/cm² or more as a current collector of the positive electrode of a secondary battery using a nonaqueous electrolytic solution. JP-A 8-298137 (KOKAI) describes that this current collector may be used for the negative electrode.

On the other hand, JP-A 11-86875 (KOKAI) relates to a positive electrode for a nonaqueous secondary battery using a liquid electrolyte or a polymer electrolyte. An aluminum foil processed to have a specific capacitance of 5 to 40 μF/cm² by etching is used as the current collector of the positive electrode described in JP-A 11-86875 (KOKOAI).

BRIEF SUMMARY OF THE INVENTION

According to a first aspect of the present invention, there is provided a nonaqueous electrolyte battery comprising:

a negative electrode including a negative electrode layer containing a negative electrode active material having a lithium ion absorption potential of 0.4 V (vs. Li/Li+) or more, and a negative electrode current collector made of aluminum or an aluminum alloy to retain the negative electrode layer;

a positive electrode including a positive electrode layer containing a positive electrode active material, and a positive electrode current collector made of aluminum or an aluminum alloy to retain the positive electrode layer, the positive electrode current collector having a total area and specific capacitance larger than those of the negative electrode current collector; and a nonaqueous electrolyte.

According to a second aspect of the present invention, there is provided a battery pack comprising a nonaqueous electrolyte battery, the nonaqueous electrolyte battery comprising:

a negative electrode including a negative electrode layer containing a negative electrode active material having a lithium ion absorption potential of 0.4 V (vs. Li/Li+) or more, and a negative electrode current collector made of aluminum or an aluminum alloy to retain the negative electrode layer;

a positive electrode including a positive electrode layer containing a positive electrode active material, and a positive electrode current collector made of aluminum or an aluminum alloy to retain the positive electrode layer, the positive electrode current collector having a total area and specific capacitance larger than those of the negative electrode current collector; and a nonaqueous electrolyte.

BRIEF DESCRIPTION OF THE SEVERAL VIEWS OF THE DRAWING

FIG. 1 is a graph showing a discharge voltage curve of a nonaqueous electrolyte battery according to a first embodiment;

FIG. 2 is a schematic drawing showing the relation between the total area of a positive electrode current collector and the total area of a negative electrode current collector in the nonaqueous electrolyte battery according to the first embodiment;

FIG. 7 is a perspective view showing an electrode group having a laminated structure used in the nonaqueous electrolyte battery according to the first embodiment;

FIG. 9 is an exploded perspective view of a battery pack according to a second embodiment;

FIG. 10 is a block diagram showing an electric circuit of the battery pack in FIG. 9;

FIG. 13 schematically illustrates a series-parallel hybrid car according to the third embodiment;

FIG. 14 schematically illustrates a sedan type automobile according to the third embodiment;

DETAILED DESCRIPTION OF THE INVENTION

First Embodiment

Figure 3:
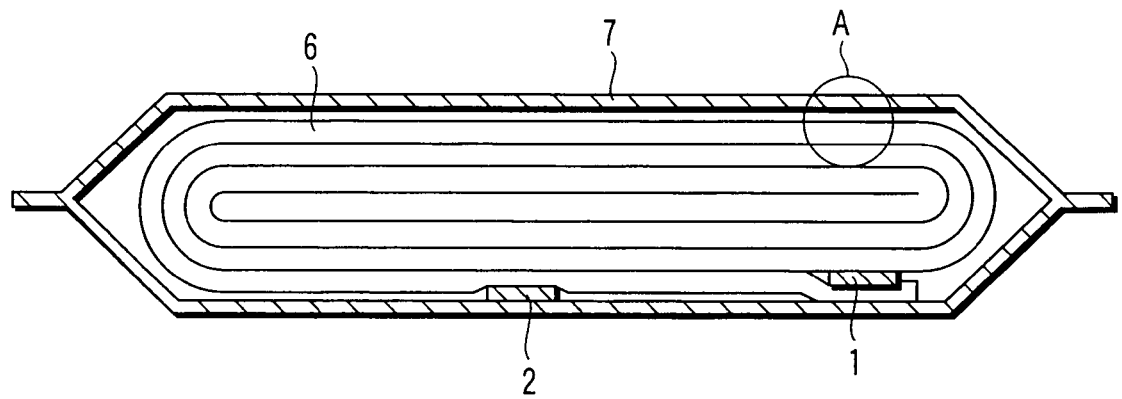
FIG. 3 schematically illustrates a cross section of a flat type nonaqueous electrolyte battery according to the first embodiment.

The inventors of the invention have found, through intensive studies, that the high temperature performance may be improved by permitting a nonaqueous electrolyte battery using a negative electrode active material having a lithium ion absorption potential of 0.4 V (vs. Li/Li$^+$) or more to have the configurations (1) and (2):

(1) both the positive electrode current collector and negative electrode current collector are formed of aluminum or an aluminum alloy; and (2) the total area and specific capacitance of the positive electrode current collector are made to be larger than those of the negative electrode current collector.

Specifically, the invention provides a nonaqueous electrolyte battery being excellent in charge-discharge cycle performance under a high temperature environment and being able to obtain a high capacity recovery rate when kept under the above-mentioned condition.

FIG. 1 shows a discharge voltage curve of the nonaqueous electrolyte battery at 45° C. comprising lithium-cobalt oxide ($LiCoO_2$) as a positive electrode active material and lithium titanate ($Li_{4+x}Ti_5O_{12}$) having a spinel structure as a negative electrode active material. As shown in the positive electrode potential curve A and negative electrode potential curve B, the potential drop of the positive electrode at the final stage of discharge of the battery is relieved under a high temperature environment of, for example, 45° C. while an increase in potential at the negative electrode becomes steep by adjusting the specific capacitance of the positive electrode current collector to be larger than the specific capacitance of the negative electrode current collector. Consequently, the battery voltage change at the final stage of discharge (shown by curve C) may be controlled by the negative electrode potential change to suppress overdischarge of the positive electrode.

On the contrary, the positive electrode potential begins to drop at a relatively early stage of the final stage of discharge as shown in the positive electrode potential curve D when the specific capacitance of the positive electrode current collector is smaller than the specific capacitance of the negative electrode current collector. Consequently, since the battery voltage change at the final stage of discharge is regulated by the change of the positive electrode potential, deterioration of the battery advances due to overdischarge at the positive electrode. In FIG. 1, the potential difference between the positive electrode potential curve A and negative electrode potential curve B is shown by $V_1$, while the potential difference between the positive electrode potential curve D and negative electrode potential curve B is shown by $V_2$.

Overdischarge is suppressed for the positive electrode by specifying the relation between the specific capacitance of the positive electrode and that of the negative electrode. However, since the degree of progress of overdischarge in an in-plane direction of the positive electrode, i.e., the degree of the potential drop of the positive electrode at the final stage of discharge is irregular, the above-mentioned method is not sufficient yet for improving the charge-discharge cycle performance and capacity recovery rate during preservation under the high temperature environment. The current is concentrated near the edge of the surface of the positive electrode by charge/discharge when the total area of the positive electrode current collector is equal to or smaller than the total area of the negative electrode current collector. As a result, deterioration of the positive electrode by overdischarge near the edge of the surface thereof advances faster than other portions since the positive electrode potential drop becomes rapid at the final stage of discharge reaction near the edge of the surface of the positive electrode. Consequently, the charge/discharge cycle performance and the capacity recovery rate during storage under the high temperature environment become insufficient.

FIG. 2 shows the relation between the total area of a positive electrode current collector 3$a$ and the total area of a negative electrode current collector 4$a$. An area as a sum of both surfaces of the current collector is used as the total area of the current collector. Since the edge portion of the surface of the positive electrode does not face the negative electrode current collector 3$a$ to be larger than the total area of the negative electrode current collector 4$a$, the current is not concentrated at the edge of the surface of the positive electrode during charge/discharge. Therefore, since the difference between the overdischarge depth near the edge of the surface of the positive electrode and the overdischarge depth at the other portions is reduced, irregular distribution of the overdischarge depth in the in-plane direction of the positive electrode may be reduced.

Overdischarge of the positive electrode under a high temperature environment is suppressed while irregular distribution of overdischarge in the in-plane direction is reduced by allowing the total area and specific capacitance of the positive electrode current collector to be larger than those of the negative electrode current corrector as described above. Therefore, a high capacity recovery rate is obtained even by storing under a high temperature condition to enable excellent charge/discharge cycle performance to be obtained under the high temperature environment.

The ratio (Ap/An) of the total area of the positive electrode current collector to the total area of the negative electrode current corrector desirably satisfies the following equation (1):

$$1 < Ap/An \leq 1.2 \qquad (1)$$

where An denotes the total area of the negative electrode current collector and Ap denotes the total area of the positive electrode current corrector.

While the ratio (Ap/An) is larger than 1 as described above, the theoretical capacity of the positive electrode that is not substantially involved in the charge/discharge reaction increases when the ratio exceeds 1.2, and a high energy density may not be obtained. Accordingly, the preferable range of the ratio (Ap/An) is in the range of 1.01 or more to 1.1 or less. The range permits a decrease in the cycle life of the battery due to overdischarge to be largely improved since a potential drop at the final stage of discharge near the edge of the surface of the positive electrode is relieved.

Irregular distribution of the overdischarge depth in the in-plane direction on the surface of the positive electrode tends to be expanded in accordance with increase in the battery size. Therefore, a satisfactory effect of the invention may be obtained by employing the configuration of this embodiment when the total area An of the negative electrode current corrector is 500 cm² or more.

The negative electrode, positive electrode and nonaqueous electrolyte will be described below.

1) Negative Electrode

The negative electrode includes a negative electrode current collector and a negative electrode layer retained on one surface or both surfaces of the negative electrode current collector and containing a negative electrode active material, a conductive agent and a binder.

The negative electrode current collector is formed of an aluminum foil or an aluminum alloy foil. The purity of aluminum is preferably 99.5% or more, more preferably 99.99% or more for improving the corrosion resistance and for enhancing the strength. The aluminum alloy preferably contains at least one element selected from the group consisting of iron, magnesium, zinc, manganese and silicon in addition to aluminum. For example, a higher strength than aluminum may be obtained by using Al—Fe base alloys, Al—Mn base alloys and Al—Mg base alloys. On the other hand, the content of transition metals such as nickel and chromium in aluminum and aluminum alloys is preferably 100 ppm or less (including 0 ppm). For example, Al—Cu base alloys are not suitable for the current collector since corrosion resistance is poor, although the strength increases. The content of aluminum in the aluminum alloy is desirably 99.5% by weight or more.

The thickness of the negative electrode current collector is preferably from 10 μm or more to 30 μm or less. Cycle life may be decreased when the thickness of the negative electrode current collector is less than 10 μm since pin holes and cracks tend to be generated.

The specific capacitance of the negative electrode current collector is desirably less than 20 μF/cm². The surface of the negative electrode current collector is preferably coated with a dense alumina layer without performing surface roughening. The negative electrode current collector having the above-mentioned specific capacitance and surface configuration has a high tensile strength with few pinholes and cracks. Accordingly, the negative electrode current collector is prevented from being broken when the negative electrode current collector is applied a large pressing pressure. Therefore, a high density negative electrode may be obtained by using a negative electrode active material with an average particle diameter of 1 μm or less. Consequently, a nonaqueous electrolyte battery having a high capacity and being excellent in cycle performance under conditions of rapid charge and high power discharge may be provided. The more preferable range of specific capacitance is from 0.01 μF/cm² or more to 15 μF/cm² or less.

The method for measuring the capacitance of the negative electrode current collector will be described below. A part of the negative electrode current collector on which the negative electrode layer is not formed is cut, washed with pure water using an ultrasonic wave and the capacitance is measured. When there is no part of the negative electrode current collector on which the negative electrode layer is not formed, the electrolyte in the negative electrode is dissolved and removed by immersing the negative electrode in dimethyl carbonate in a dry atmosphere, and the negative electrode is dried. The negative electrode layer is removed from the negative electrode current collector by immersing the negative electrode in pure (warm) water. The capacitance is measured after further washing the negative electrode current collector using an ultrasonic wave.

For measuring the capacitance, a counter electrode and a working electrode of the same test piece are immersed in an electrolytic solution prepared by dissolving 150 g of ammonium adipate in 1000 ml of pure water. And the capacitance is measured with a capacitance meter 60 minutes after the start of immersion. The measuring temperature is 30° C.±2° C.

Metal oxides, metal sulfides, metal nitrides and alloys having a lithium ion absorption potential of 0.4 V (vs. Li/Li⁺) or more may be used as the negative electrode active material. The charge/discharge cycle performance is deteriorated due to precipitation of lithium dendrites on the negative electrode by increasing the total area of the positive electrode current collector to be larger than the total area of the negative electrode current collector, when the lithium ion absorption potential is smaller than 0.4 V (vs. Li/Li+). The lithium ion absorption potential is preferably in the range of 0.4 V (vs. Li/Li⁺) or more to 3 V (vs. Li/Li⁺) or less, more preferably 0.4 V (vs. Li/Li⁺) or more to 2 V (vs. Li/Li⁺) or less, for obtaining a high battery voltage.

Examples of the metal oxide capable of absorbing lithium ion in the range of 0.4 V (vs. Li/Li⁺) or more to 3 V (vs. Li/Li⁺) or less include titanium oxides, lithium-titanium oxides, tungsten oxides such as $WO_3$, amorphous tin oxides such as $SnBo_{0.4}P_{0.6}O_{3.1}$, tin silicon oxides such as $SnSiO_3$, and silicon oxides such as SiO.

Metal oxides that do not contain lithium before the charge/discharge reaction and contain titanium as a metal component may be used as the titanium oxide. Examples thereof include $TiO_2$ and composite oxides containing Ti and at least one element selected from the group consisting of P, V, Sn, Cu, Ni, Co and Fe. $TiO_2$ is preferably an anatase type having low crystallinity by heat-treating at a temperature from 300 to 500° C. Examples of the composite oxide containing Ti and at least one element selected from the group consisting of P, V, Sn, Cu, Ni, Co and Fe include $TiO_2$—$P_2O_5$, $TiO_2$—$V_2O_5$, $TiO_2$—$P_2O_5$—$SnO_2$ and $TiO_2$—$P_2O_5$-MeO (Me is at least one element selected from the group consisting of Cu, Ni, Co and Fe). The composite oxide preferably has a microstructure in which a crystalline phase and an amorphous phase coexist or a microstructure consisting of the amorphous phase. The cycle performance may be largely improved by forming such microstructure.

Lithium-titanium oxides are preferably used for the negative electrode active material. Examples of the lithium-titanium oxide include lithium titanate having a spinel structure such as $Li_{4+x}Ti_5O_{12}$ (x changes in the range of $0 \leq x \leq 3$ by charge/discharge reaction) and lithium titanate having a rhamsdelite structure such as $Li_{2+y}Ti_3O_7$ (y changes in the range of $0 \leq y \leq 3$ by charge/discharge reaction).

Since the lithium-titanium oxide is able to suppress a reaction with the nonaqueous electrolyte under a high temperature environment, self-discharge under the high temperature environment may be suppressed. Since the lithium-titanium oxide has a small expansion-shrinkage coefficient as a result of absorption and desorption of lithium ions, the negative electrode may be suppressed from being rapidly expanded/shrunk by repeating rapid charging, and the microstructure of the negative electrode active material may be suppressed from failure by repeating rapid charging. Since the diffusion time of lithium ions is shortened and the specific surface area is improved by adjusting the average particle diameter of the lithium-titanium oxide to be 1 μm or less, a high utilization of the active material may be ensured in the case of rapid charge and high power discharge. Accordingly, it is possible to provide the nonaqueous electrolyte battery favorably used as a substitute of a lead-acid battery as a secondary battery used for the power source of vehicle starters, a vehicle-mounted secondary battery to be mounted on electric cars and hybrid cars, and an electricity storing secondary battery used for leveling electric power.

Examples of the metal sulfide capable of absorbing lithium ions in the range of 0.4 V (vs. Li/Li$^+$) or more to 3 V (vs. Li/Li$^+$) or less include lithium sulfides such as TiS$_2$, molybdenum sulfides such as MoS$_2$, and iron sulfides such as FeS, FeS$_2$ and Li$_x$FeS$_2$.

Examples of the metal nitride capable of absorbing lithium ions in the range of 0.4 V (vs. Li/Li$^+$) or more to 3 V (vs. Li/Li$^+$) or less include lithium-cobalt nitride such as Li$_x$Co$_y$N (0<x<4, 0<y<0.5).

The average particle diameter of the negative electrode active material is desirably 1 μm or less, since the charge/discharge cycle performance under a high temperature environment may be further improved. This effect is particularly evident in high power discharge. A more preferable average particle diameter is 0.3 μm or less. However, if the average particle diameter is too small, primary particles are liable to be aggregated or the distribution of the nonaqueous electrolyte may be inclined toward the negative electrode and there is therefore a fear as to a shortage of the nonaqueous electrolyte at the positive electrode. Therefore, its lower limit is preferably 0.001 μm.

The negative electrode active material with an average particle diameter of 1 μm or less may be obtained by the steps of: preparing an active material precursor from a raw material; baking the precursor; and grinding the baked material using a pulverizer such as a ball mill and a jet mill. A part of the active material precursor may be aggregated and grown into secondary particles having a larger particle diameter in the baking process. Therefore, incorporation of the secondary particles may be accepted in the negative electrode active material. Since a material having a smaller particle diameter is readily pulverized, the particle diameter of the active material precursor is preferably 1 μm or less.

A carbonaceous material may be used as a conductive agent. Examples of the carbonaceous material include acetylene black, carbon black, coke, carbon fiber and graphite.

Examples of the binder include polytetrafluoroethylene (PTFE), polyvinylidene fluoride (PVdF), fluorine-base rubber and styrene-butadiene rubber.

As for the blend ratios of the negative electrode active material, conductive agent and binder, the ratios are preferably in the ranges of 80% by weight or more to 95% by weight or less for the negative electrode active material, 3% by weight or more to 18% by weight or less for the conductive agent, and 2% by weight or more to 7% by weight or less for the binder. The above-mentioned effect can be exhibited when the proportion of the conductive agent is 3% by weight or more, and decomposition of the nonaqueous electrolyte can be reduced on the surface of the conductive agent when under high temperatures when the proportion of the conductive agent is 18% by weight or less. A sufficient strength of the electrode may be obtained when the proportion of the binder is 2% by weight or more, and the proportion of insulation parts of the electrode can be reduced when the proportion is 7% by weight or less.

The density of the negative electrode is desirably from 1.5 g/cm$^3$ or more to 5 g/cm$^3$ or less, more preferably from 2 g/cm$^3$ or more to 4 g/cm$^3$ or less, since a high battery capacity can be obtained in these ranges.

The negative electrode is prepared, for example, by suspending the negative electrode active material, conductive agent and binder in an appropriate solvent, and by coating one surface or both surfaces of the negative electrode current collector with this suspension, followed by drying and pressing.

2) Positive Electrode

The positive electrode contains a positive electrode current collector, and a positive electrode layer retained on one surface or both surfaces of the positive electrode current collector and containing a positive electrode active material, conductive agent and binder.

The positive electrode current collector is formed of an aluminum foil or an aluminum alloy foil. The aluminum alloy preferably contains aluminum as well as at least one element selected from the group consisting of copper, iron, magnesium, zinc, manganese and silicon. The particularly preferable aluminum alloy foil has an aluminum purity of 99% or more and contains from 0.05% by weight or more to 0.3% by weight or less of at least one element of copper and manganese.

The specific capacitance of the positive electrode current collector is desirably from 20 μF/cm$^2$ or more to 150 μF/cm$^2$ or less. This range suppresses the potential from rapidly decreasing at the final stage of discharge, and overdischarge is relieved. It may be difficult to obtain a sufficient effect when the specific capacitance is smaller than 20 μF/cm$^2$. When the specific capacitance exceeds 150 μF/cm$^2$, the tensile strength of the positive electrode current collector may be decreased. Accordingly, a more preferable range is from 25 μF/cm$^2$ to 100 μF/cm$^2$.

The positive electrode current collector having the specific capacitance in the range of 20 μF/cm$^2$ or more to 150 μF/cm$^2$ or less is produced by the method described below. The material of the positive electrode current corrector is preferably an aluminum alloy with an aluminum purity of 99% or more having a composition containing at least one element of copper and manganese in a proportion from 0.05% by weight or more to 0.3% by weight or less. This is because the positive electrode current collector having the specific capacitance in the above-described range can be readily produced by surface roughening treatment of the aluminum alloy foil having the above-mentioned composition by, for example, etching.

Examples of the chemical surface roughening treatment include chemical or electroless etching in a solution containing chloride ions and electrochemical etching. The purity of aluminum is preferably in the range of 99% or more to 99.5% or less when the chemical surface roughening treatment is applied. While either direct current etching or alternating current etching is used for electrochemical etching, it is preferable to form fine pits with a size of 0.05 μm or more to 0.5 μm or less by alternating current etching. It is necessary to suppress a chemical conversion coating from being formed by anodic oxidation. For this purpose, the positive electrode current collector is preferably dried and stored under a dry environment or in an inert gas atmosphere.

The method for measuring the capacitance of the positive electrode current collector will be described below. A portion of the positive electrode current collector on which no positive electrode layer is formed is cut, the cut sample piece is washed with pure water using an ultrasonic wave, and the capacitance of the sample piece is measured. When there is no portion of the positive electrode current collector on which the positive electrode layer is not formed, the current collector is immersed in dimethyl carbonate solvent in a dry atmosphere to dissolve and remove the electrolyte in the positive electrode, followed by drying. The current collector is immersed in pure (warm) water to allow the positive electrode layer to be removed from the positive electrode current collector. The capacitance of the current collector is measured after ultrasonic cleaning. The method for measuring the capacitance is the same as that described in the negative electrode current collector.

The thickness of the positive electrode current collector is preferably from 10 μm or more to 30 μm or less. When the positive electrode current collector is thinner than 10 μm, pin holes and cracks are readily formed and cycle life may be decreased.

The amount of the positive electrode layer per one surface of the positive electrode current collector, i.e., the weight per unit area, is preferably from 20 g/m² or more to 200 g/m² or less. Since this range permits the positive electrode active material to be uniformly used, and a rapid potential drop at the final stage of discharge is relieved under large current discharge, shortening of cycle life due to overdischarge is largely improved.

Examples of the positive electrode active material include oxides, sulfides and polymers. One kind or plural kinds of the positive electrode active material may be used.

Examples of the oxide include manganese dioxide ($MnO_2$), iron oxide, copper oxide, nickel oxide, lithium-manganese oxide such as $Li_xMn_2O_4$ and $Li_xMnO_2$, lithium-nickel oxide such as $Li_xNiO_2$, lithium-cobalt oxide such as $Li_xCoO_2$, lithium-nickel-cobalt oxide such as $LiNi_{1-y}Co_yO_2$, lithium-manganese-cobalt oxide such as $LiMn_yCo_{1-y}O_2$, lithium-nickel-manganese-cobalt oxide such as $Li_xNi_yMn_zCo_{1-y-z}O_2$, spinel type lithium-manganese-nickel oxide such as $Li_xMn_{2-y}Ni_yO_4$, lithium phosphate having an divine structure such as $Li_xFePO_4$, $Li_xFe_{1-y}Mn_yPO_4$ and $Li_xCoPO_4$, iron sulfate such as $Fe_2(SO_4)_3$, and vanadium oxide such as $V_2O_5$. x, y and z are preferably in the range of 0 to 1.

Examples of the polymer include conductive polymer materials such as polyaniline and polypyrrole, and disulfide polymer materials. Other materials available are sulfur (S) and fluorine-based carbon.

Examples of the positive electrode active material that affords a high positive electrode potential include lithium-manganese oxide, lithium-nickel oxide, lithium-cobalt oxide, lithium-nickel-cobalt oxide, lithium-nickel-manganese-cobalt oxide, spinel type lithium-manganese-nickel oxide, lithium-manganese-cobalt oxide and lithium iron phosphate.

As a combination of the positive electrode active material and negative electrode active material that affords a sufficient effect, at least one oxide of a first oxides (lithium-cobalt base oxides) containing lithium and cobalt and a second oxides (lithium-manganese base oxides) which contain lithium and manganese and have a spinel structure is used for the positive electrode active material, and lithium titanate having the spinel structure is used for the negative electrode active material. Since the above-mentioned positive electrode active material is excellent in plateau characteristic of the discharge potential, progress of overdischarge of the positive electrode can be retarded by adjusting the total area and specific capacitance of the positive electrode current collector to be larger than those of the negative electrode current collector in order to regulate the battery voltage change at the final stage of discharge by the negative electrode potential change. Consequently, the charge/discharge cycle performance under a high temperature environment and capacity recovery rate when kept under a high temperature environment can be further improved.

Examples of the second oxides (lithium-manganese base oxides) include lithium-manganese oxide having the spinel structure [for example $Li_xMn_2O_4$ ($0<x\leq1$), $Li_xMnO_2$ ($0<x\leq1$)], and lithium-manganese-nickel oxide having the spinel structure [for example $Li_xMn_{2-y}Ni_yO_4$ ($0<x\leq1$, $0<y\leq0.6$)].

Examples of the first oxides (lithium-cobalt base oxides) include lithium-cobalt oxide [for example $Li_xCoO_2$ ($0<x\leq1.1$)]. It is particularly desirable for the first oxide to be lithium-cobalt oxide particles having at least one element selected from the group consisting of Mg, Al, Ti, Sn, Zr, Ba and B on the surface of the particles. Such lithium-cobalt oxide particles can suppress an oxidative decomposition reaction of the nonaqueous electrolyte by the positive electrode and suppress an increase in the interface resistance of the positive electrode. Accordingly, a rapid potential drop at the final stage of discharge can be suppressed and a decrease in the cycle life due to overdischarge is improved. The lithium-cobalt oxide particles desirably have these elements on the surface of the particle by coating at least a part of the lithium-cobalt oxide particle with a metal oxide layer containing the above-mentioned elements.

Examples of the conductive agent include acetylene black, carbon black and graphite.

Examples of the binder include polytetrafluoroethylene (PTFE), polyvinylidene fluoride (PVdF) and fluorine-based rubber.

With respect to the blend ratio of the positive electrode active material, conductive agent and binder, the preferable ratio is from 80% by weight or more to 95% by weight or less for the positive electrode active material, from 3% by weight or more to 18% by weight or less for the conductive agent and from 2% by weight or more to 7% by weight or less for the binder. The content of the conductive agent of 3% by weight or more can exhibit the above-mentioned effect, while the content of 18% by weight or less can decrease the decomposition of the nonaqueous electrolyte on the surface of the conductive agent when kept at high temperatures. A sufficient strength of the electrode can be obtained with a binder content of 2% by weight or more, and insulation portions of the electrode can be decreased at the content of 7% by weight or less.

The positive electrode is produced, for example, by dispersing the positive electrode active material, conductive agent and binder in an appropriate solvent, and by coating the suspension on one surface or both surfaces of the positive electrode current collector followed by drying and pressing.

3) Nonaqueous Electrolyte

Examples of the nonaqueous electrolyte include a liquid nonaqueous electrolyte prepared by dissolving an electrolyte in an organic solvent, a gelatinous nonaqueous electrolyte obtained by complexing the liquid nonaqueous electrolyte and a polymer material, and a solid nonaqueous electrolyte prepared by complexing a lithium salt electrolyte and a polymer material. An ionic liquid containing lithium ions may be used as the nonaqueous electrolyte.

The liquid nonaqueous electrolyte is prepared by dissolving the electrolyte in an organic solvent at a concentration of 0.5 to 2.5 mol/L.

Examples of the electrolyte include $LiBF_4$, $LiPF_6$, $LiAsF_6$, $LiClO_4$, $LiCF_3SO_3$, $LiN(CF_3SO_2)_2$, $LiN(C_2H_5SO_2)_2$, $Li(CF_3SO_2)_3C$ and $LiB[(OCO)_2]_2$. One kind or plural kinds of the electrolyte may be used. $LiBF_4$ has a higher effect for suppressing AlF from being formed on the surface of the positive electrode current collector than $LiPF_6$.

Examples of the organic solvent include cyclic carbonates such as propylene carbonate (PC) and ethylene carbonate (EC); linear carbonates such as diethyl carbonate (DEC), dimethyl carbonate (DMC) and methylethyl carbonate (MEC); linear ethers such as dimethoxyethane (DME) and diethoxyethane (DEE); cyclic ethers such as tetrahydrofuran (THF) and dioxolane (DOX); and γ-butyrolactone (GBL), acetonitrile (AN) and sulfolane (SL). One of these organic solvents may be used alone, or as a mixture of a plurality of them.

Examples of the polymer material include polyvinylidene fluoride (PVdF), polyacrylonitrile (PAN) and polyethylene oxide (PEO).

The ionic liquid is preferably composed of lithium ions, organic cations and organic anions. The ionic liquid is preferably a liquid at 100° C. or less, preferably at room temperature or less.

The nonaqueous electrolyte battery according to an embodiment has a separator disposed between the positive electrode and the negative electrode, and an outer casing member for housing them.

4) Separator

Examples of the separator include a porous film and nonwoven fabric of a synthetic resin containing polyethylene, polypropylene, cellulose or polyvinylidene fluoride (PVdF). The porous film made of polyethylene or polypropylene is preferable in terms of safety since they melt at a given temperature and are able to block electric current. Clogging of the cellulose nonwoven fabric may be suppressed during storage at high temperatures since porosity of the fabric is high.

5) Outer Casing Member

Examples of the outer casing member include a laminate film container with a wall thickness of 0.5 mm or less and a metal container with a wall thickness of 0.5 mm or less. The shape of the container is made to conform to the shape of the nonaqueous electrolyte battery. Examples of the shape of the nonaqueous electrolyte battery include a flat shape, a rectangular shape, a cylindrical shape, a coin shape, a button shape, a sheet shape, a laminated shape, and shape of a large battery mounted in electric cars.

The preferable range of the thickness of the laminate film is 0.2 mm or less. The lower limit of the thickness of the laminate film is desirably 0.01 mm.

The preferable range of the thickness of the metal sheet of the metal container is 0.2 mm or less. The lower limit of the thickness of the metal sheet of the metal container is desirably 0.05 mm.

An example of the laminate film is a multilayer laminate film having a metal layer and a resin layer for coating the metal layer. The metal layer is preferably an aluminum foil or an aluminum alloy foil for making the container lightweight. The resin layer is used for reinforcing the metal layer, and may be formed of a polymer such as polypropylene (PP), polyethylene (PE), nylon and polyethylene terephthalate (PET).

The laminate film container is obtained by bonding the laminate film by heat fusion.

The metal container is desirably made of aluminum or an aluminum alloy. The average crystal grain size of aluminum or aluminum alloy is preferably 50 μm or less. The average crystal grain size of 50 μm or less enhances the strength of the metal container made of aluminum or aluminum alloy, and a sufficient mechanical strength of the container can be ensured even with a small thickness of the container wall. Utilizing a thin wall enables the temperature of the battery to be suppressed from increasing, since the heat dissipation ability of the container is improved. A lightweight and small-sized battery are enabled by improving the energy density. More preferably, the average crystal grain size is 10 μm or less. While the chemical and physical strength of the container is increased as the average crystal grain size is smaller, the fine structure is desirably crystalline for obtaining excellent conductivity. Accordingly, the lower limit of the average crystal grain size is desirably 0.01 μm.

These features are favorable for batteries used under high temperatures and the need for high energy density, as in vehicle-mounted secondary batteries for example.

The purity of aluminum is desirably 99.99% or more. Examples of the preferable aluminum alloy include alloys containing elements such as magnesium, zinc and silicon. On the other hand, the content of the transition metal such as iron, copper, nickel and chromium in aluminum and aluminum alloy is preferably 100 ppm or less.

The metal container can be sealed by laser. Consequently, the volume of the sealed part can be reduced as compared with the laminate film container, and the energy density can be increased.

Figure 8:
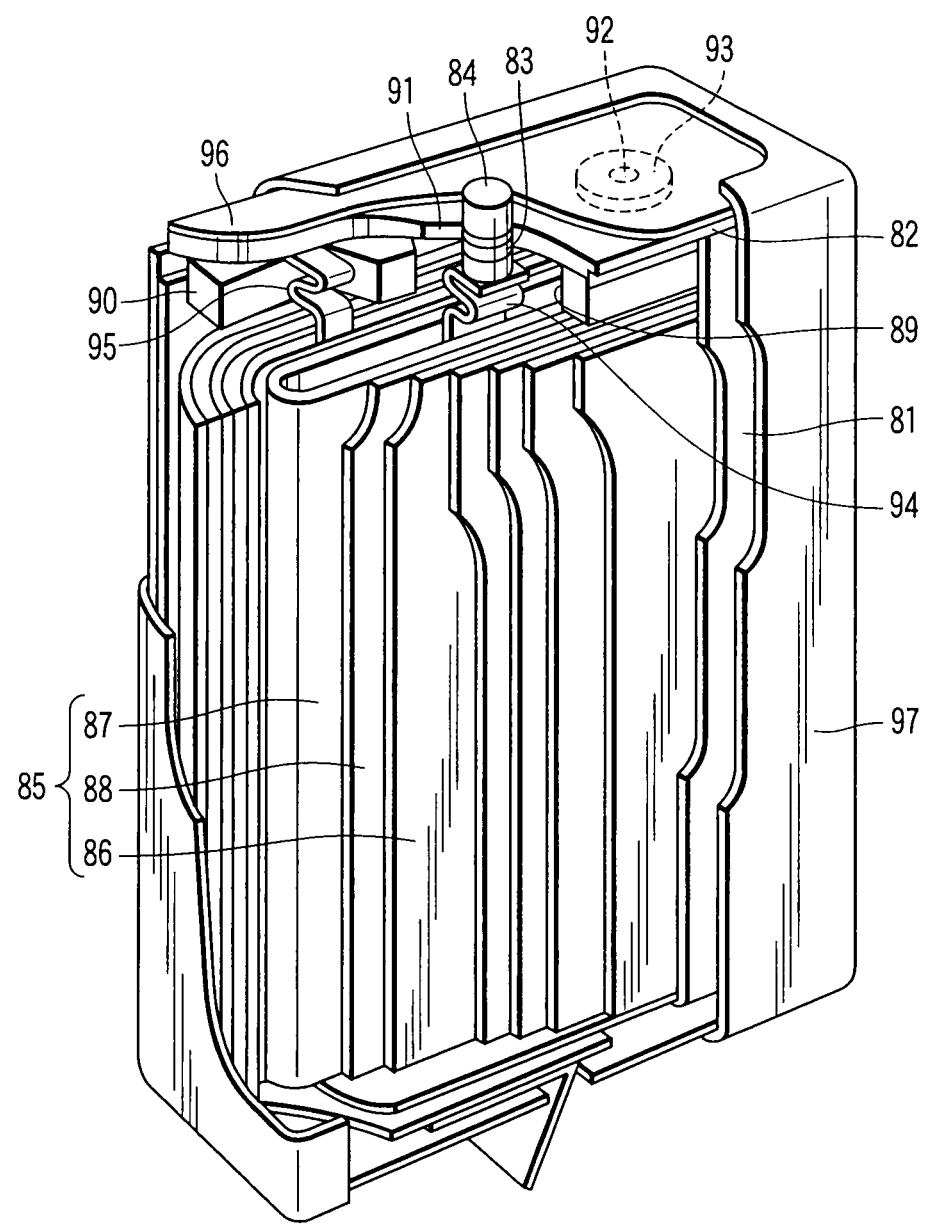
FIG. 8 is a partial cutaway perspective view showing a rectangular shape nonaqueous electrolyte battery according to the first embodiment.

The structure of the nonaqueous electrolyte battery according to the first embodiment is not particularly restricted, and the battery may have various shapes such as flat, rectangular and cylindrical shapes. An example of the flat-shaped nonaqueous electrolyte battery is shown in FIGS. 3 to 6, while an example of the rectangular nonaqueous electrolyte battery is shown in FIG. 8.

As shown in FIG. 3, a flat-shape coiled electrode group 6 is housed in an outer casing member 7. The coiled electrode group 6 has a structure in which a positive electrode 3 and a negative electrode 4 are spirally coiled with a separator 5 interposed therebetween. A nonaqueous electrolyte is held in the coiled electrode group 6.

Figure 4:
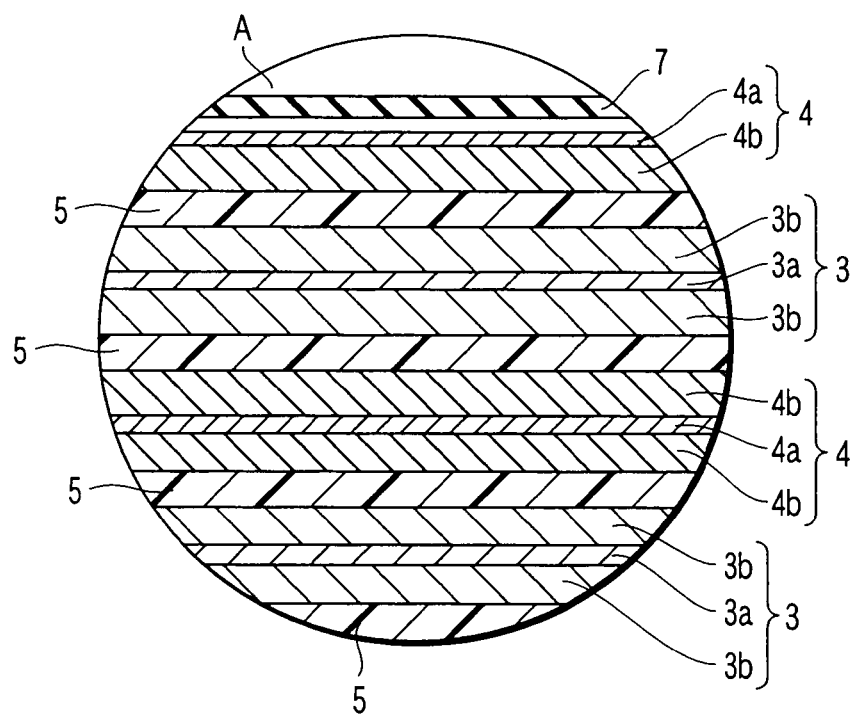
FIG. 4 is a schematic partial cross sectional view showing the portion surrounded by circle A in FIG. 3 in detail.

As shown in FIG. 4, the negative electrode 4 is positioned on the outermost periphery of the coiled electrode group 6, and the positive electrodes 3 and the negative electrodes 4 are alternately laminated with the separator 5 interposed therebetween in such a manner that on the inside periphery of the negative electrode 4, separator 5, positive electrode 3, separator 5, negative electrode 4, separator 5, positive electrode 3, separator 5 . . . are laminated in this order. The negative electrode 4 comprises a negative electrode current collector 4a and a negative electrode layer 4b supported by the negative electrode current collector 4a. The negative electrode layer 4b is formed on only one surface of the negative electrode current collector 4a at a part positioned on the outermost periphery of the electrode group 6. The positive electrode 3 comprises a positive electrode current collector 3a and a positive electrode layer 3b supported by the positive electrode current collector 3a.

Figure 5:
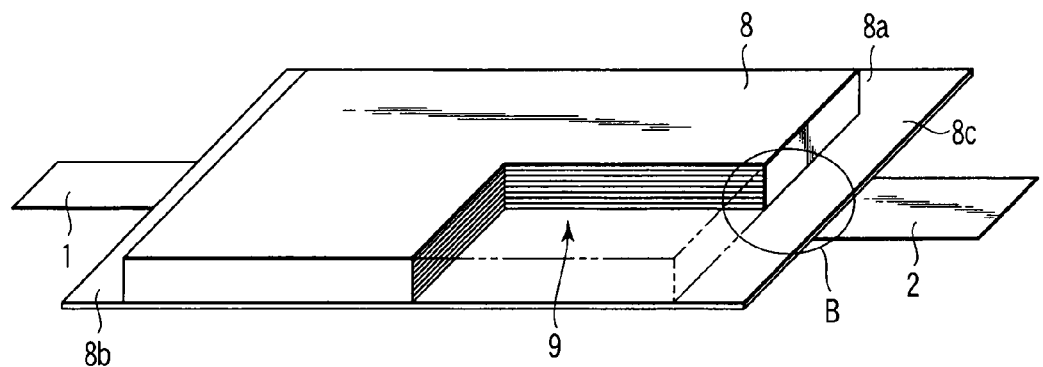
FIG. 5 is a partial cutaway perspective view showing another nonaqueous electrolyte battery according to the first embodiment.
Figure 6:
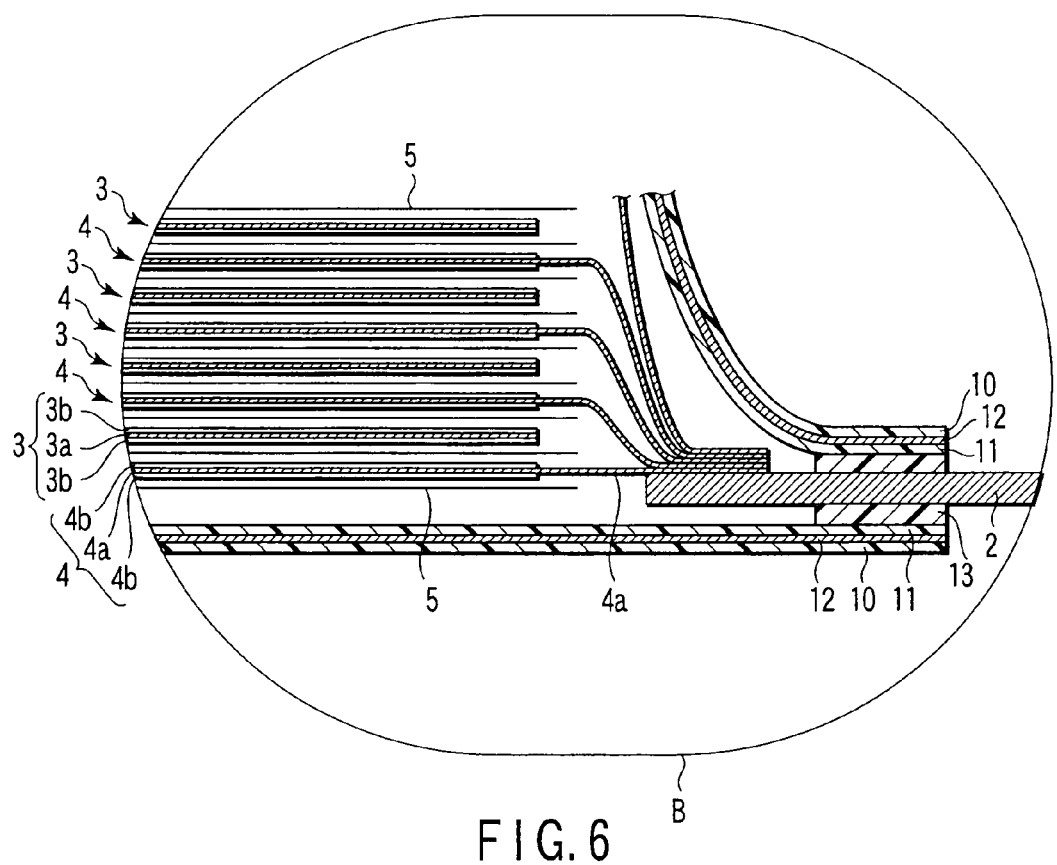
FIG. 6 is a schematic partial cross sectional view showing the portion surrounded by circle B in FIG. 5 in detail.

As shown in FIG. 3, a band-shaped positive electrode terminal 1 is electrically connected to the positive electrode current collector 3a in the vicinity of the outer peripheral end of the coiled electrode group 6. On the other hand, a band-shaped negative electrode terminal 2 is electrically connected to the negative electrode current collector 4a in the vicinity of the outer peripheral end of the coiled electrode group 6. Each end of the positive electrode terminal 1 and the negative electrode terminal 2 is drawn externally from the same side of the outer casing member 7. In FIGS. 5 and 6, the positive electrode terminal 1 and the negative electrode terminal 2 are pulled out in opposite directions, respectively, to one another.

As shown in FIG. 5, a laminate type electrode group 9 is housed in an outer casing member 8 made of a laminate film. The laminate film comprises a resin layer 10, a thermoplastic resin layer 11, and a metal layer 12 disposed between the resin layer 10 and the thermoplastic resin layer 11 as shown in FIG. 6. The thermoplastic resin layer 11 is positioned on the inside surface of the outer casing member 8. Heat seal parts 8a, 8b and 8c are formed by thermal fusion of the thermoplastic resin layer 11 on one long side and both short sides of the outer casing member 8 made of a laminate film. The outer casing member 8 is sealed by these heat seal parts 8a, 8b and 8c.

The laminate type electrode group 9 comprises plural positive electrodes 3, plural negative electrodes 4 and a separator 5 interposed between each positive electrode 3 and each negative electrode 4. The laminate type electrode group 9 has a structure in which the positive electrode 3 and the negative electrode 4 are alternately laminated with the separator 5 interposed therebetween as shown in FIG. 6. Each positive electrode 3 comprises a positive electrode current collector 3a and a positive electrode layer 3b supported on both surfaces of the positive electrode current collector 3a. Each negative electrode 4 comprises a negative electrode current collector 4a and a negative electrode layer 4b supported on both surfaces of the negative electrode current collector 4a. One short side of each of the negative electrode current collectors 4a of the negative electrodes 4 is projected from the positive electrode 3. The negative electrode current collector 4a projected from the positive electrode 3 is electrically connected to a band-like negative electrode terminal 2. The end of the band-like negative electrode terminal 2 is drawn externally through the heat seal part 8c of the outer casing member 8. Both surfaces of the negative electrode terminal 2 face the thermoplastic resin layer 11 constituting the heat seal part 8c. An insulating film 13 is interposed between each surface of the negative electrode terminal 2 and the thermoplastic resin layer 11 to improve the binding strength between the heat seal part 8c and the negative electrode terminal 2. Examples of the insulating film 13 may include films formed from materials obtained by adding an acid anhydride to polyolefin containing at least one of polypropylene and polyethylene.

Though not shown here, one short side of each of the positive electrode current collectors 3a of the positive electrodes 3 is projected from the negative electrode 4. The positive electrode current collector 3a and the negative electrode current collector 4a are projected in directions opposite to each other. The positive electrode current collector 3a projected from the negative electrode 4 is electrically connected to the band-like positive electrode terminal 1. The end of the band-like positive electrode terminal 1 is drawn externally through the heat seal part 8b of the outer casing member 8. In order to improve the binding strength between the heat seal 8b and the positive electrode terminal 1, an insulating film 13 is interposed between the positive electrode terminal 1 and the thermoplastic resin layer 11. The positive electrode terminal 1 and the negative electrode terminal 2 are drawn in directions opposite to each other from the outer casing member 8. As an example of the unit cell of the nonaqueous electrolyte battery according to the first embodiment, an electrode group having a coiled structure is shown in FIGS. 3 and 4, and an electrode group having a laminated structure is shown in FIGS. 5 and 6. While strip- or bag-shaped separator structures may be adopted for the laminated structure as shown in FIGS. 5 and 6, the separator may be folded in a zigzag shape as shown in FIG. 7. A band-shaped separator 5 is folded in a zigzag shape. A strip-like positive electrode $3_1$, a strip-like negative electrode $4_1$ a strip-like positive electrode $3_2$ and a strip-like negative electrode $4_2$ are inserted in this order from above into the overlapped part of the separators 5. A positive electrode terminal 14 is drawn from each short side of the strip-like positive electrodes $3_1$ and $3_2$. An electrode group having a laminate structure is obtained by alternately disposing the positive electrode 3 and the negative electrode 4 between the overlapped parts of the separator 5 folded in a zigzag shape in this manner. The nonaqueous electrolyte battery according to the embodiment is not restricted to those using the laminated film container as shown in FIGS. 3 to 7, and the battery may comprise a metal container as shown in FIG. 8.

The outer casing member includes a container 81 made of aluminum or aluminum alloy and having a rectangular cylindrical shape with a bottom, a lid 82 disposed at the opening of the container 81, and a negative electrode terminal 84 attached at the lid 82 via an insulation material 83. The container 81 also serves as a positive electrode terminal. Aluminum or an aluminum alloy having the above-mentioned composition may be used for the container 81.

An electrode group 85 is housed in the container 81. The electrode group 85 has a structure in which a positive electrode 86 and a negative electrode 87 are coiled in a flat shape with a separator 88 disposed therebetween. This electrode group 85 is obtained in the following manner: for example, a band-like product obtained by laminating the positive electrode 86, the separator 88 and the negative electrode 87 in this order is coiled in a spiral form by using a plate or cylindrical core such that the positive electrode 86 is positioned on the outside, and the obtained coiled product is molded under pressure in the radial direction.

The nonaqueous electrolytic solution (liquid nonaqueous electrolyte) is retained in the electrode group 85. A spacer 90 made of a synthetic resin having a lead outlet hole 89 near the center is disposed on the electrode group 85 in the container 81.

An outlet hole 91 of the negative electrode terminal 84 is open near the center of the lid 82. A liquid injection port 92 is provided at a position remote from the outlet hole 91 of the lid 82. The liquid injection port 92 is hermetically sealed with a sealing plug 93 after injecting the liquid nonaqueous electrolyte into the container 81. The negative electrode terminal 84 is hermetically sealed at the outlet hole 91 of the lid 82 with interposition of the insulation material 83 made of a glass or resin.

A negative electrode lead tab 94 is welded to the lower surface of the negative electrode terminal 84. The negative electrode lead tab 94 is electrically connected to the negative electrode 87. One end of a positive electrode lead 95 is electrically connected to the positive electrode 86, and the other end thereof is welded to the bottom face of the lid 82. The outer surface of the lid 82 is covered with an insulation paper sheet 96. An outer package tube 97 covers the entire side face of the container 81, and the upper and lower ends thereof are folded onto the upper surface and lower surface, respectively, of the battery.

Second Embodiment

The battery pack according to the second embodiment comprises the nonaqueous electrolyte battery according to the first embodiment as unit cell. A plurality of the unit cells may be used. The unit cells are electrically connected in series or parallel to form an assembled battery.

The unit cell according to the first embodiment is suitable for use as the assembled battery, while the battery pack according to the second embodiment is excellent in charge/discharge cycle performance under high temperature environments. These features will be described below.

Since the nonaqueous electrolyte battery according to the first embodiment is excellent in charge/discharge cycle performance under high temperatures, any irregularity of charge/discharge cycle performance among the unit cells can be largely suppressed. Accordingly, the battery pack according to the second embodiment can improve the charge/discharge cycle performance at high temperatures. Since battery voltage changes at the final stage of discharge can be made uniform among the unit cells by using the nonaqueous electrolyte battery according to the first embodiment as the unit cell, the charging and discharging can be readily controlled.

The flat nonaqueous electrolyte battery shown in FIG. 3, 5 or 8 may be used for the unit cell.

Each of a plurality of unit cells 21 included in the battery pack shown in FIG. 9 is formed of, though not limited to, a flattened type nonaqueous electrolyte battery constructed as shown in FIG. 3. The plural unit cells 21 are stacked one upon the other in the thickness direction in a manner to align the protruding directions of the positive electrode terminals 1 and the negative electrode terminals 2. As shown in FIG. 10, the unit cells 21 are connected in series to form a battery module 22. The unit cells 21 forming the battery module 22 are made integral by using an adhesive tape 23 as shown in FIG. 9.

A printed wiring board 24 is arranged on the side surface of the battery module 22 toward which protrude the positive electrode terminals 1 and the negative electrode terminals 2. As shown in FIG. 10, a thermistor 25, a protective circuit 26 and a terminal 27 for current supply to the external equipment are connected to the printed wiring board 24.

As shown in FIGS. 9 and 10, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium metal electrodes used as reference electrodes are inserted into the unit cells 21.

In the case of FIG. 10, a wiring 32 is connected to each of the unit cells 21 for detecting the voltage, and the detection signal is transmitted through these wirings 32 to the protective circuit 26.

Protective sheets 33 each formed of rubber or resin are arranged on the three of the four sides of the battery module 22, though the protective sheet 33 is not arranged on the side toward which protrude the positive electrode terminals 1 and the negative electrode terminals 2. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 9 and 10 are connected in series. However, it is also possible to connect the unit cells 21 in parallel to increase the cell capacity. Of course, it is possible to connect the battery packs in series and in parallel.

Also, the embodiments of the battery pack can be changed appropriately depending on the use of the battery pack.

The battery pack of the second embodiment is preferably applied to uses where cycle performance under a large current is desired. Specific examples of the application of the battery pack include uses as power sources of digital cameras, and uses for vehicles such as two- to four-wheel hybrid electric cars, two- to four-wheel electric cars and power-assisted bicycles. The uses for vehicles are particularly preferable.

Third Embodiment

The vehicle according to the third embodiment comprises the battery pack according to the second embodiment. A large current of about 10 C usually flows in vehicle-mounted battery packs. Since the unit cell of the first embodiment can suppress deterioration due to overdischarge of the positive electrode at a large current discharge, it is also excellent in charge/discharge cycle performance under a large current. Further, since any irregularity of the charge/discharge cycle life among the unit cells can be reduced, the battery pack according to the second embodiment is excellent in cycle performance under a large current. Accordingly, the vehicle according to the third embodiment is excellent in performance of driving source. The vehicle as used herein includes two- to four-wheel hybrid electric cars, from two- to four-wheel electric cars, and motor-assisted bicycles.

Figure 11:
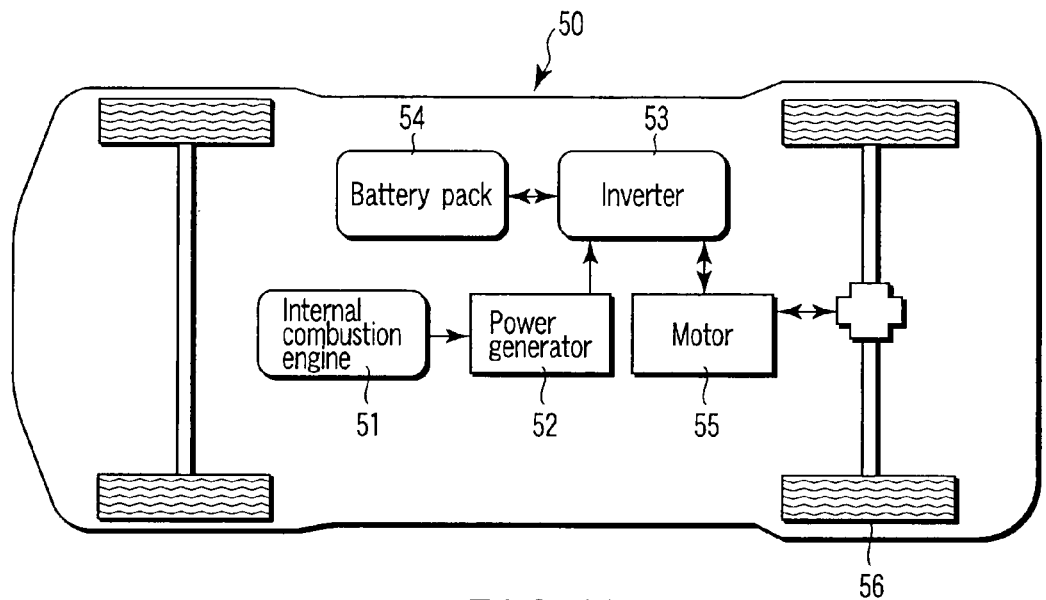
FIG. 11 schematically illustrates a series hybrid car according to a third embodiment.
Figure 12:
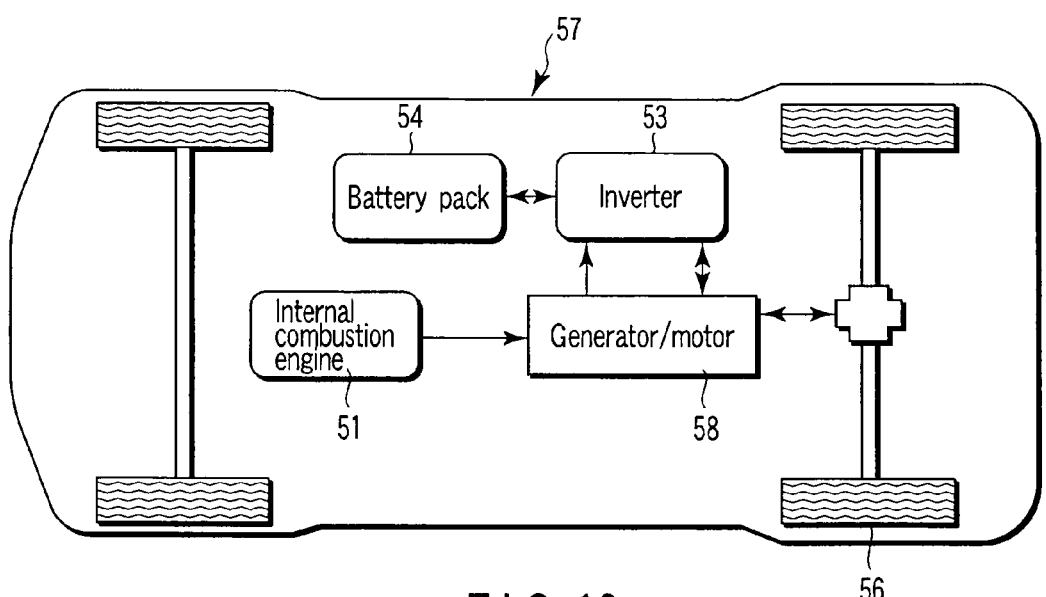
FIG. 12 schematically illustrates a parallel hybrid car according to the third embodiment.

FIGS. 11 to 13 show various type of hybrid vehicles in which an internal combustion engine and a motor driven by a battery pack are used in combination as the power source for the driving. The hybrid vehicle can be roughly classified into three types depending on the combination of the internal combustion engine and the electric motor.

FIG. 11 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack according to the second embodiment is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 11 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above is the capacity at the time when the battery pack is discharged at a rate of 0.2 C.

FIG. 12 shows the construction of a hybrid vehicle 57 that is called a parallel hybrid vehicle. A reference numeral 58 shown in FIG. 12 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 12 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 3 to 10 Ah.

FIG. 13 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 3 to 10 Ah.

It is desirable for the nominal voltage of the battery pack included in the hybrid vehicles as shown in FIGS. 11 to 13 to fall within a range of 200 to 600 V.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 14, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the automobile.

An electric vehicle (EV) is driven by the energy stored in the battery pack that is charged by the electric power supplied from outside the vehicle. Since all the power required for the driving of the vehicle is produced by an electric motor, it is necessary to use an electric motor of a high output. In general, it is necessary to store all the energy required for one driving in the battery pack by one charging. It follows that it is necessary to use a battery pack having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 15:
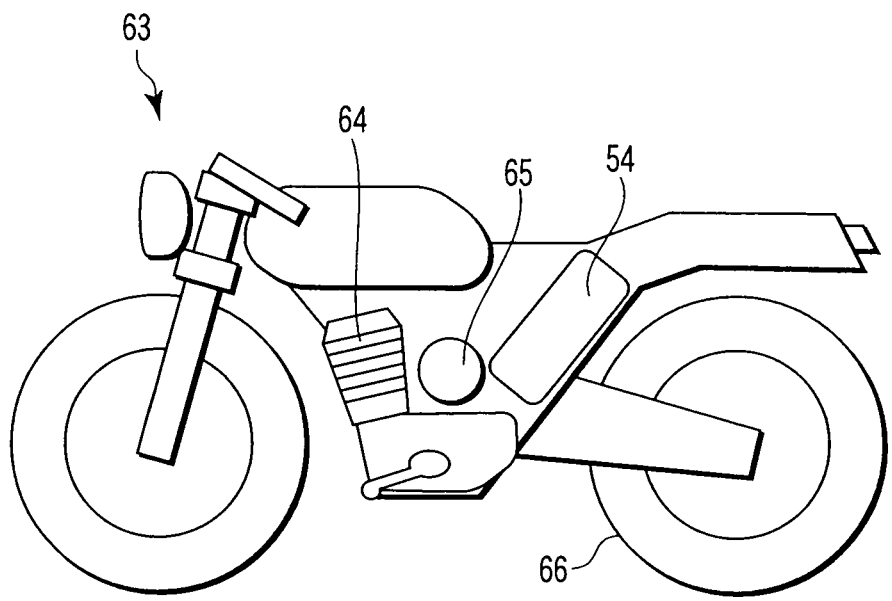
FIG. 15 schematically illustrates a hybrid motorcycle according to the third embodiment.

FIG. 15 exemplifies the construction of a hybrid motor bicycle 63. It is possible to construct a hybrid motor bicycle 63 exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 16:
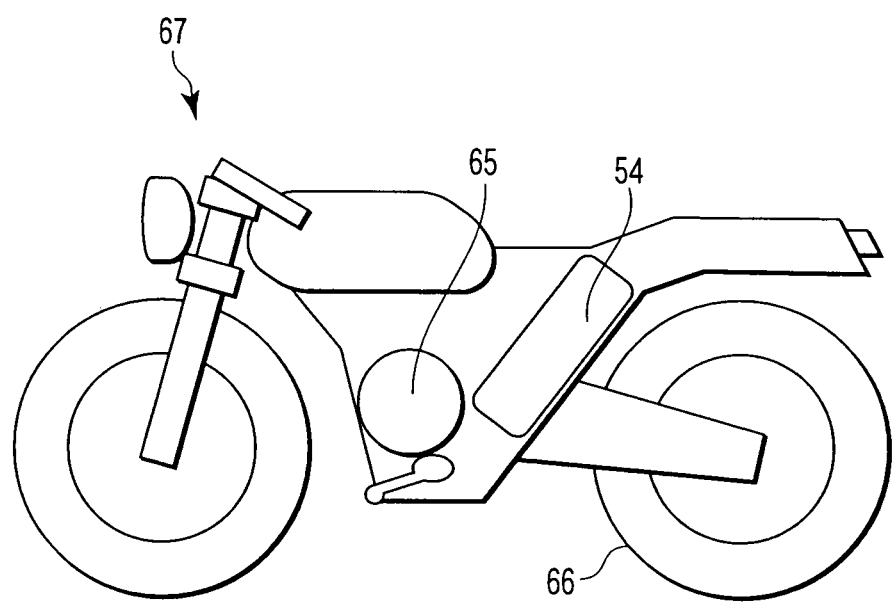
FIG. 16 schematically illustrates an electric motorcycle according to the third embodiment.

FIG. 16 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery pack having a relatively large capacity. It is desirable for the rated capacity of the battery pack to fall within a range of 10 to 50 Ah, more desirably 15 to 30 Ah.

Fourth Embodiment

Figure 17:
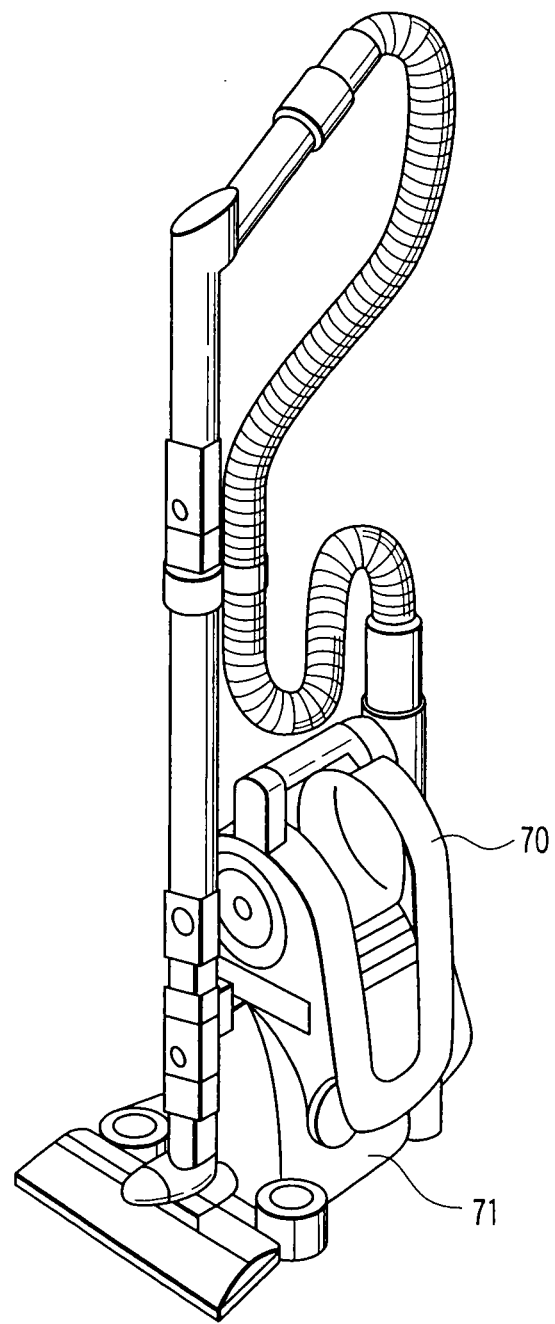
FIG. 17 schematically illustrates a rechargeable vacuum cleaner according to a fourth embodiment.
Figure 18:
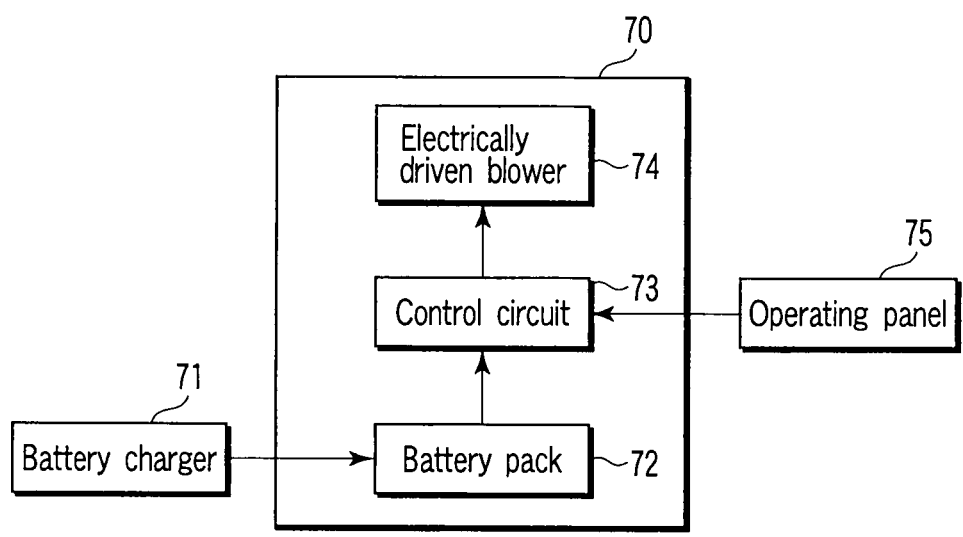
FIG. 18 shows the configuration of the rechargeable vacuum cleaner in FIG. 17.

FIGS. 17 and 18 show an example of a rechargeable vacuum cleaner according to a fourth embodiment. The rechargeable vacuum cleaner comprises an operating panel 75 which selects operation modes, an electrically driven blower 74 comprising a fun motor for generating suction power for dust collection, and a control circuit 73. A battery pack 72 according to the second embodiment as a power source for driving these units are housed in a casing 70. When the battery pack is housed in such a portable device, the battery pack is desirably fixed with interposition of a buffer material in order to prevent the battery pack from being affected by vibration. Known technologies may be applied for maintaining the battery pack at an appropriate temperature. While a battery charger 71 that also serves as a setting table functions as the battery charger of the battery pack according to the second embodiment, a part or all of the function of the battery charger may be housed in the casing 70.

While the rechargeable vacuum cleaner consumes a large electric power, the rated capacity of the battery pack is desirably in the range of 2 to 10 Ah, more preferably 2 to 4 Ah, in terms of portability and operation time. The nominal voltage of the battery pack is desirably in the range of 40 to 80 V.

A large electric current of about 3 C to 5 C usually flows in the battery pack for rechargeable vacuum cleaners, and such vacuum cleaners are used from a fully charged state to a completely discharged state. Since deterioration of the positive electrode of the unit cell of the first embodiment due to overdischarge is small even when discharged at a large current, the unit cell is excellent in the charge/discharge cycle performance under a large current. Consequently, since irregularity of the charge/discharge cycle performance among the unit cells can be reduced, the battery pack of the second embodiment is excellent in cycle performance under a large current. Therefore, the battery in the rechargeable vacuum cleaner according to the fourth embodiment is resistant to damage caused by repeated charging/discharging.

Examples of the invention will be described with reference to the foregoing drawings. However, the invention is not restricted to the examples as set forth below.

Example 1

<Preparation of Negative Electrode>

A powder of lithium titanate represented by $Li_4Ti_5O_{12}$ with an average particle diameter of 0.5 μm and lithium ion absorption potential of 1.55 V (vs. Li/Li+) as an active material, a carbon powder with an average particle diameter of 0.4 μm as a conductive agent and polyvinylidene fluoride (PVdF) as a binder were blended in a weight ratio of 90:7:3, and a slurry was prepared by dispersing the mixture in an n-methyl pyrrolidone (NMP) solvent.

A laser diffraction particle size analyzer (trade name: SALD-300, manufactured by Shimadzu Corporation) was used for the measurement of the particle diameter of the active material. After placing about 0.1 g of the sample in a beaker, a surfactant and 1 to 2 mL of distilled water were added to the sample and thoroughly stirred, and the solution was injected into a stirring water vessel. The light intensity distribution was measured 64 times at an interval of 2 seconds, the particle size distribution data was analyzed, and a particle diameter with a cumulative frequency distribution of 50% (D50) was determined as the average particle diameter.

Meanwhile, an aluminum foil with a specific capacitance of 0.1 μF/cm² and a thickness of 15 μm, was prepared as the negative electrode current collector. The aluminum foil had a purity of 99.99%, and the total area as the sum of the areas of both surfaces was 3,600 cm². A value of twice the product of the length of the long side and the length of the short side of the negative electrode current collector was used as the total area of the negative electrode current collector.

The slurry was applied on the both surfaces of the negative electrode current collector, and a negative electrode with an electrode density of 2.4 g/cm³ was prepared by pressing after drying.

The method for measuring the negative electrode density was as follows.

The negative electrode on both surfaces of which the slurry was applied was cut into a size of 5 cm×5 cm, and the total weight and thickness of the electrode were measured. Then, the negative electrode layer was peeled from the both surfaces of the negative electrode using acetone, the weight and thickness of the current collector were measured, and the density of the negative electrode ρ (g/cm³) was calculated from equation (2):

$$\rho = (W_0 - W_1)/((T_0 - T_1) \times S) \quad (2)$$

where $W_0$ denotes the total weight (g) of the electrode, $W_1$ denotes the weight (g) of the current collector, $T_0$ denotes the thickness (cm) of the electrode, $T_1$ denotes the thickness (cm) of the current collector, and S denotes the area of the negative electrode, which is 25 cm² in this case.

<Preparation of Positive Electrode>

Lithium-cobalt oxide ($LiCoO_2$) as an active material, a graphite powder as a conductive agent and polyvinylidene fluoride (PVdF) as a binder were blended in a weight ratio of 87:8:5, and a slurry was prepared by dispersing the mixture in an n-methyl pyrrolidone (NMP) solvent. An aluminum alloy foil with a thickness of 20 μm, purity of 99.3%, copper content of 0.2% by weight and a total area as a sum of the areas of both surfaces of 3,800 cm² was prepared. The aluminum alloy foil was subjected to surface roughening treatment by chemical etching in which fines pits with a width from 0.1 to 0.5 μm were uniformly formed by applying an alternate current to the aluminum alloy foil in an aqueous hydrochloride solution followed by washing with pure water and drying. The aluminum alloy foil had a specific capacitance of 80 μF/cm². A value of twice the product of the length of the long side and the length of the short side of the positive electrode current collector was used as the total area of the positive electrode current collector.

The slurry was applied on both surfaces of the positive electrode current collector, and a positive electrode with an electrode density of 3.5 cm³ was prepared by pressing after drying. The amount of the positive electrode layer per one surface of the obtained positive electrode current collector (weight per unit area) was 75 g/m².

A laminate film containing aluminum and having a thickness of 0.1 mm was prepared as the material for forming the container. The aluminum layer of the laminate film had a thickness of about 0.03 mm with an average crystal grain size of about 100 μm. Polypropylene was used as the resin for reinforcing the aluminum layer. The laminate films were bonded by heat fusion to obtain a container as the outer casing member.

Subsequently, a belt of a positive electrode terminal was electrically joined to the positive electrode, while a belt of a negative electrode terminal was electrically joined to the negative electrode. The positive electrode was covered with a separator made of a polyethylene porous film with a thickness of 15 μm. The negative electrode was put on the positive electrode covered with the separator so that both electrodes face one another, and the resultant structure was wound in a spiral form to manufacture an electrode group. The electrode group was formed into a flat shape by pressing. The flat-shaped electrode group was inserted into the container.

$LiBF_4$ as a lithium salt was dissolved in a concentration of 1.5 mol/L in a mixed organic solvent prepared by mixing EC and GBL in a volume ratio (EC:GBL) of 1:2 to prepare a liquid nonaqueous electrolyte. The nonaqueous electrolyte obtained was injected into the container, and a nonaqueous electrolyte secondary battery was produced as a flat nonaqueous electrolyte battery having the structure shown in FIG. 3 described previously with a thickness of 3.8 mm, a width of 63 mm and a height of 95 mm.

Examples 2 to 5

Each nonaqueous electrolyte battery having the same structure as that obtained in Example 1 was produced, except that the specific capacitance of the positive electrode current collector was changed to each value shown in Table 1 below. Examples 1 to 5 were provided for investigating the effect of the capacitance of the positive electrode current collector.

Examples 6 to 8

Each nonaqueous electrolyte battery having the same structure as that obtained in Example 1 was produced, except that the capacitance of the negative electrode current collector was changed to each value shown in Table 1 below. Examples 6 to 8 were provided for investigating the effect of the specific capacitance of the negative electrode current collector.

Example 9

A nonaqueous electrolyte battery having the same structure as that obtained in Example 1 was produced, except that an aluminum alloy foil with a purity of 99.3%, a manganese content of 0.1% by weight and a thickness of 20 µm, which was subjected to surface roughening treatment by alternating current etching and has a specific capacitance of 80 µF/cm², was used as the positive electrode current collector.

Example 10 to 12 and 14

Each nonaqueous electrolyte battery having the same structure as that obtained in Example 1 was produced, except that the ratio of the total area of the positive electrode current collector to the total area of the negative electrode current collector was changed as shown in Table 1 below. Examples 10 to 12 and 14 were provided for investigating the effect of the ratio of the total area of the positive electrode current collector to the total area of the negative electrode current collector.

Example 13

A nonaqueous electrolyte battery was produced by the same method as in Example 1, except that LiCoO₂ particles a part of which was covered with an MgO layer were used as the positive electrode active material.

Comparative Examples 1 to 7

A nonaqueous electrolyte battery having the same structure as that in Example 1 was produced, except that the specific capacitance and total area of the positive and negative electrode current collectors, respectively, were set as shown in Table 1 below.

Comparative Example 8

A nonaqueous electrolyte battery having the same structure as that in Example 1 was produced, except that the weight per unit area of the positive electrode layer was 250 g/m² and the specific capacitance and total area of the positive and negative electrode current collectors were changed to the values shown in Table 1 below.

The nonaqueous electrolyte batteries obtained were used for the following two tests.

In test (1), the battery was stored for 60 days in an environment of 60° C. after 100% discharge. The battery was recharged 100% thereafter, and a rate of increment of direct current resistance and capacity deterioration rate by discharge were measured.

The rate of increment of direct current resistance was measured as follows. Electric currents corresponding to 5 C ($I_{5C}$) and 10 C ($I_{10C}$) were flowed in the battery for 0.2 second, and respective voltage differences ($\Delta V_{10C}$ and $\Delta V_{5C}$) after 0.2 second were measured. The direct current resistance (R) was measured by the following equation. The increment rate of the direct current resistance (R) after the storage test to the direct current resistance (R) before the test was calculated, and the value is shown in Table 1:

$$R=(\Delta V_{10C}-\Delta V_{5C})/(I_{10C}-I_{5C})$$

In test (2), constant current/constant voltage charging at 5 C rate/2.8 V was performed for 15 minutes under an environment of 45° C., and constant current discharge at 1 C rate was performed until the voltage became 1.5 V. The constant current/constant voltage charging and constant current discharge were repeated. The rate of increment of direct current resistance of the battery was measured at a 100% charged state after 1000 cycles of the test.

TABLE 1

| | Specific capacitance of positive electrode current collector (µF/cm²) | Specific capacitance of negative electrode current collector (µF/cm²) | Total area of positive electrode current collector Ap (cm²) | Total area of negative electrode current collector An (cm²) | Total area ratio Ap/An | Rate of increment of direct current resistance after storage test | Capacity recovery rate after storage test (%) | Rate of increment of direct current resistance after cycle test |
|---|---|---|---|---|---|---|---|---|
| Example 1 | 80 | 0.1 | 3800 | 3600 | 1.056 | 1.2 | 97 | 1.4 |
| Example 2 | 20 | 0.1 | 3800 | 3600 | 1.056 | 1.35 | 97 | 1.5 |
| Example 3 | 60 | 0.1 | 3800 | 3600 | 1.056 | 1.3 | 98 | 1.6 |
| Example 4 | 100 | 1 | 3800 | 3600 | 1.056 | 1.15 | 98 | 1.35 |
| Example 5 | 150 | 1 | 3800 | 3600 | 1.056 | 1.1 | 98 | 1.3 |
| Example 6 | 20 | 15 | 3800 | 3600 | 1.056 | 1.55 | 96 | 1.8 |
| Example 7 | 20 | 5 | 3800 | 3600 | 1.056 | 1.5 | 96 | 1.8 |
| Example 8 | 20 | 18 | 3800 | 3600 | 1.056 | 1.6 | 90 | 1.9 |
| Example 9 | 80 | 0.1 | 3800 | 3600 | 1.056 | 1.15 | 98 | 1.4 |
| Example 10 | 80 | 0.1 | 3800 | 3762 | 1.01 | 1.7 | 90 | 2.0 |
| Example 11 | 80 | 0.1 | 3800 | 3689 | 1.03 | 1.4 | 96 | 1.6 |
| Example 12 | 80 | 0.1 | 3800 | 3454 | 1.10 | 1.2 | 95 | 1.4 |
| Example 13 | 80 | 0.1 | 3800 | 3600 | 1.056 | 1.1 | 97 | 1.3 |
| Example 14 | 80 | 0.1 | 3800 | 3167 | 1.2 | 1.2 | 97 | 1.38 |
| Comparative Example 1 | 0.1 | 1 | 3800 | 3800 | 1.0 | 2.8 | 65 | 2.5 |
| Comparative Example 2 | 0.5 | 1 | 3800 | 3800 | 1.0 | 2.5 | 68 | 2.4 |
| Comparative Example 3 | 1 | 1 | 3420 | 3800 | 0.9 | 2.5 | 70 | 2.5 |
| Comparative Example 4 | 0.1 | 25 | 3610 | 3800 | 0.95 | 2.5 | 60 | 2.5 |
| Comparative Example 5 | 0.1 | 30 | 3420 | 3800 | 0.9 | 3 | 55 | 3 |

TABLE 1-continued

|  | Specific capacitance of positive electrode current collector (μF/cm²) | Specific capacitance of negative electrode current collector (μF/cm²) | Total area of positive electrode current collector Ap (cm²) | Total area of negative electrode current collector An (cm²) | Total area ratio Ap/An | Rate of increment of direct current resistance after storage test | Capacity recovery rate after storage test (%) | Rate of increment of direct current resistance after cycle test |
|---|---|---|---|---|---|---|---|---|
| Comparative Example 6 | 0.1 | 80 | 3420 | 3800 | 0.9 | 3.5 | 50 | 4 |
| Comparative Example 7 | 80 | 0.1 | 3420 | 3800 | 0.9 | 2.3 | 80 | 2.5 |
| Comparative Example 8 | 80 | 0.1 | 3800 | 3800 | 1.0 | 2.5 | 70 | 2.5 |

Table 1 shows that the rate of increment of direct current resistance after the high temperature storage test and cycle test was low and the capacity recovery rate after the high temperature storage test was also high in Examples 1 to 14 as compared with Comparative Examples 1 to 8. Consequently, it was confirmed that the cycle life performance of the battery under the high temperature environment was largely improved.

The comparison of the results among Examples 1, 10 to 12 and 14 shows that the batteries with total area ratios (Ap/An) in the range of 1.01 or more to 1.1 or less in Examples 1 and 10 to 12 show a lower rate of increment of direct current resistance after the cycle test. It was confirmed from the comparison between the results in Example 1 and Example 13 that the rate of increment of direct current resistances are suppressed after the high temperature storage test and cycle test when at least one element selected from the group consisting of Mg, Al, Ti, Sn, Zr, Ba and B is distributed on the surface of the lithium-cobalt oxide particles.

The results in Comparative Example 7 show that the rate of increment of direct current resistance increases after the high temperature storage test and cycle test when the total area of the negative electrode current collector is larger than the total area of the positive electrode current corrector even when the specific capacitance of the positive electrode current collector is larger than the specific capacitance of the negative electrode current collector, and that the relation of the total areas is important for improving the performance. The performance was further decreased as shown in Comparative example 8 when the weight per unit area of the positive electrode layer is larger than 200 g/m² in Comparative Example 7. This is considered to be because the increased specific capacitance of the positive electrode current collector is hardly reflected on the discharge potential change when the weight per unit area of the positive electrode layer is larger than 200 g/m².

The lithium ion absorption potential of the negative electrode active material used in Examples was measured by the method described below.

The negative electrode was cut into a small piece sized at 2 cm×2 cm to obtain a working electrode. The working electrode was arranged to face a counter electrode formed of a lithium metal foil sized at 2.2 cm×2.2 cm with a glass filter separator interposed therebetween, and a lithium metal used as a reference electrode was inserted so as not to be brought into contact with any of the working electrode and the counter electrode. These electrodes were put in a glass cell of a three pole type such that each of the working electrode, the counter electrode and the reference electrode was connected to the terminal of the glass cell. Under the particular condition, 25 mL of an electrolytic solution, which was prepared by dissolving LiBF$_4$ in a concentration of 1.5 mol/L in a mixed solvent prepared by mixing ethylene carbonate (EC) and γ-butyrolactone (GBL) in a mixing ratio by volume of 1:2, was poured into the glass cell such that the separator and the electrodes were sufficiently impregnated with the electrolytic solution, followed by hermetically closing the glass cell. The glass cell thus manufactured was arranged in a constant temperature bath maintained at 25° C. to measure the lithium ion absorption potential of the working electrode at the time when the glass cell was charged with a current density of 0.1 mA/cm².

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
    a negative electrode including a negative electrode layer containing a negative electrode active material having a lithium ion absorption potential of 0.4 V (vs. Li/Li+) or more, and a negative electrode current collector made of aluminum or an aluminum alloy to retain the negative electrode layer;
    a positive electrode including a positive electrode layer containing a positive electrode active material, and a positive electrode current collector made of aluminum or an aluminum alloy to retain the positive electrode layer, the positive electrode current collector having a total area and specific capacitance larger than those of the negative electrode current collector; and
    a nonaqueous electrolyte,
    wherein the negative electrode current collector and the positive electrode current collector satisfy the following equation (I):

$$1 < Ap/An \leq 1.2 \qquad (I)$$

where An denotes the total area of the negative electrode current collector and Ap denotes the total area of the positive electrode current collector.

2. The nonaqueous electrolyte battery according to claim 1, wherein An is 500 cm² or more.

3. The nonaqueous electrolyte battery according to claim 1, wherein an amount of the positive electrode layer per one surface of the positive electrode current collector is from 20 to 200 g/m².

4. The nonaqueous electrolyte battery according to claim 1, wherein the specific capacitance of the positive electrode current collector is from 20 to 150 μF/cm², and the specific capacitance of the negative electrode current collector is less than 20 μF/cm².

5. The nonaqueous electrolyte battery according to claim 1, wherein the positive electrode current collector is an aluminum alloy foil having an aluminum purity of 99% or more and containing from 0.05 to 0.3% by weight of at least one element of copper and manganese.

6. The nonaqueous electrolyte battery according to claim 1, wherein the positive electrode active material is at least one oxide of a first oxide containing lithium and cobalt and a second oxide which contains lithium and manganese and has a spinel structure.

7. The nonaqueous electrolyte battery according to claim 6, wherein the first oxide contains lithium-cobalt oxide particles having at least one element selected from the group consisting of Mg, Al, Ti, Sn, Zr, Ba and B on the surface of the particles.

8. The nonaqueous electrolyte battery according to claim 1, wherein the negative electrode active material contains a lithium-titanium oxide.

9. The nonaqueous electrolyte battery according to claim 1, wherein the negative electrode active material contains lithium titanate having a spinel structure.

10. The nonaqueous electrolyte battery according to claim 1, wherein an average particle diameter of the negative electrode active material is 1 μm or less.

11. A battery pack comprising a nonaqueous electrolyte battery, the nonaqueous electrolyte battery comprising:
a negative electrode including a negative electrode layer containing a negative electrode active material having a lithium ion absorption potential of 0.4 V (vs. Li/Li+) or more, and a negative electrode current collector made of aluminum or an aluminum alloy to retain the negative electrode layer;
a positive electrode including a positive electrode layer containing a positive electrode active material, and a positive electrode current collector made of aluminum or an aluminum alloy to retain the positive electrode layer, the positive electrode current collector having a total area and specific capacitance larger than those of the negative electrode current collector; and
a nonaqueous electrolyte,
wherein the negative electrode current collector and the positive electrode current collector satisfy the following equation (I):

$$1 < Ap/An \leq 1.2 \qquad (I)$$

where An denotes the total area of the negative electrode current collector and Ap denotes the total area of the positive electrode current collector.

12. The nonaqueous electrolyte battery according to claim 11, wherein An is 500 cm² or more.

13. The battery pack according to claim 11, wherein an amount of the positive electrode layer per one surface of the positive electrode current collector is from 20 to 200 g/m².

14. The battery pack according to claim 11, wherein the specific capacitance of the positive electrode current collector is from 20 to 150 μF/cm², and the specific capacitance of the negative electrode current collector is less than 20 μF/cm².

15. The battery pack according to claim 11, wherein the positive electrode current collector is an aluminum alloy foil having an aluminum purity of 99% or more and containing from 0.05 to 0.3% by weight of at least one element of copper and manganese.

16. The battery pack according to claim 11, wherein the positive electrode active material is at least one oxide selected from the group consisting of $Li_xMn_2O_4$ ($0 \leq x \leq 1$), $Li_xMnO_2$ ($0 \leq x \leq 1$) and $Li_xMn_{2-y}Ni_yO_4$ ($0 < x \leq 1$, $0 < y \leq 0.6$).

17. The battery pack according to claim 11, wherein the positive electrode active material is at least one oxide of a first oxide containing lithium and cobalt and a second oxide which contains lithium and manganese and has a spinel structure.

18. The battery pack according to claim 11, wherein the negative electrode active material contains a lithium-titanium oxide.

19. A vehicle comprising the nonaqueous electrolyte battery according to claim 1.

\* \* \* \* \*